US011112257B2

(12) United States Patent
Jeswani et al.

(10) Patent No.: US 11,112,257 B2
(45) Date of Patent: Sep. 7, 2021

(54) NAVIGATION WITH SUN GLARE INFORMATION

(71) Applicant: Microsoft Technology Licensing, LLC, Redmond, WA (US)

(72) Inventors: Sapna Jeswani, Redmond, WA (US); Ajoy Nandi, Redmond, WA (US); Vinay Bhat, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 568 days.

(21) Appl. No.: 15/968,902

(22) Filed: May 2, 2018

(65) Prior Publication Data

US 2019/0339088 A1 Nov. 7, 2019

(51) Int. Cl.
*G01C 21/34* (2006.01)
*G01C 21/36* (2006.01)

(52) U.S. Cl.
CPC ..... *G01C 21/3461* (2013.01); *G01C 21/3691* (2013.01)

(58) Field of Classification Search
None
See application file for complete search history.

(56) References Cited

U.S. PATENT DOCUMENTS

| 9,279,693 | B2* | 3/2016 | Hymel | G01C 21/3461 |
| 2015/0269292 | A1* | 9/2015 | Shin | G01C 21/3469 |
| | | | | 703/2 |
| 2016/0195406 | A1 | 7/2016 | Miles et al. | |
| 2017/0090478 | A1* | 3/2017 | Blayvas | G07C 5/0808 |
| 2018/0053415 | A1 | 2/2018 | Krunic et al. | |
| 2018/0164107 | A1* | 6/2018 | Yalla | G01C 21/3461 |

(Continued)

FOREIGN PATENT DOCUMENTS

| DE | 102017218779 A1 * | 4/2019 | ......... G01C 21/3461 |
| EP | 2498059 A1 | 9/2012 | |
| EP | 2629056 A1 | 8/2013 | |

(Continued)

OTHER PUBLICATIONS

Salinas-Monteagudo Raul, Machine Translation of DE-102017218779-A1, 2019, espacenet.com (Year: 2019).*

(Continued)

*Primary Examiner* — David P. Merlino
(74) *Attorney, Agent, or Firm* — Watson Patents, PLC; Vladan M. Vasiljevic

(57) ABSTRACT

Representative embodiments disclose mechanisms to utilize navigation routes in order to avoid or minimize sun glare along the navigation route. Some embodiments first estimate whether it is likely that sun glare will be perceived while navigating between a starting location and an ending location. If sun glare is likely, the navigation route is calculated using sun glare as part of a cost function. If sun glare is not likely, the navigation route is calculated without regard to sun glare. Real-time sun glare feedback can be received from one user device and used in sun glare calculations for another user device. In some embodiments a trained machine learning model can be utilized as part of the sun glare calculation. Other embodiments include digital assistants that use sun glare information to recommend actions and/or take actions on behalf of a user.

20 Claims, 13 Drawing Sheets

(56) References Cited

U.S. PATENT DOCUMENTS

2019/0186931 A1* 6/2019 Dittmer .............. G01C 21/3461
2019/0217864 A1* 7/2019 Kusukame ........... G05D 1/0088

FOREIGN PATENT DOCUMENTS

JP        3550765 B2   8/2004
WO   2010040386 A1   4/2010

OTHER PUBLICATIONS

"International Search Report & Written Opinion Issued in PCT Application No. PCT/US2019/028429", dated Jul. 19, 2019, 14 Pages.
"Route Planning in Transportation Networks", arXiv:1504.05140v1 [cs.DS] published Apr. 20, 2015, 65 pages.
"Route Planning with Flexible Objective Functions", Algorithm Engineering and Experimentation, Jan. 16, 2010, p. 124-137.

* cited by examiner

NAVIGATION WITH SUN GLARE INFORMATION

FIELD

This application relates generally to navigation. More specifically, in some aspects, this application relates to calculating navigation routes to account for sun glare. In other aspects, a digital assistant can recommend mitigation for projected sun glare.

BACKGROUND

Sun glare represents a safety issue for both human drivers and for self-driving vehicles. Lack of insight into possible sun glare along a route can cause both inconvenience and distractions and lead to accidents.

It is within this context that the present embodiments arise.

DETAILED DESCRIPTION

Figure 1:
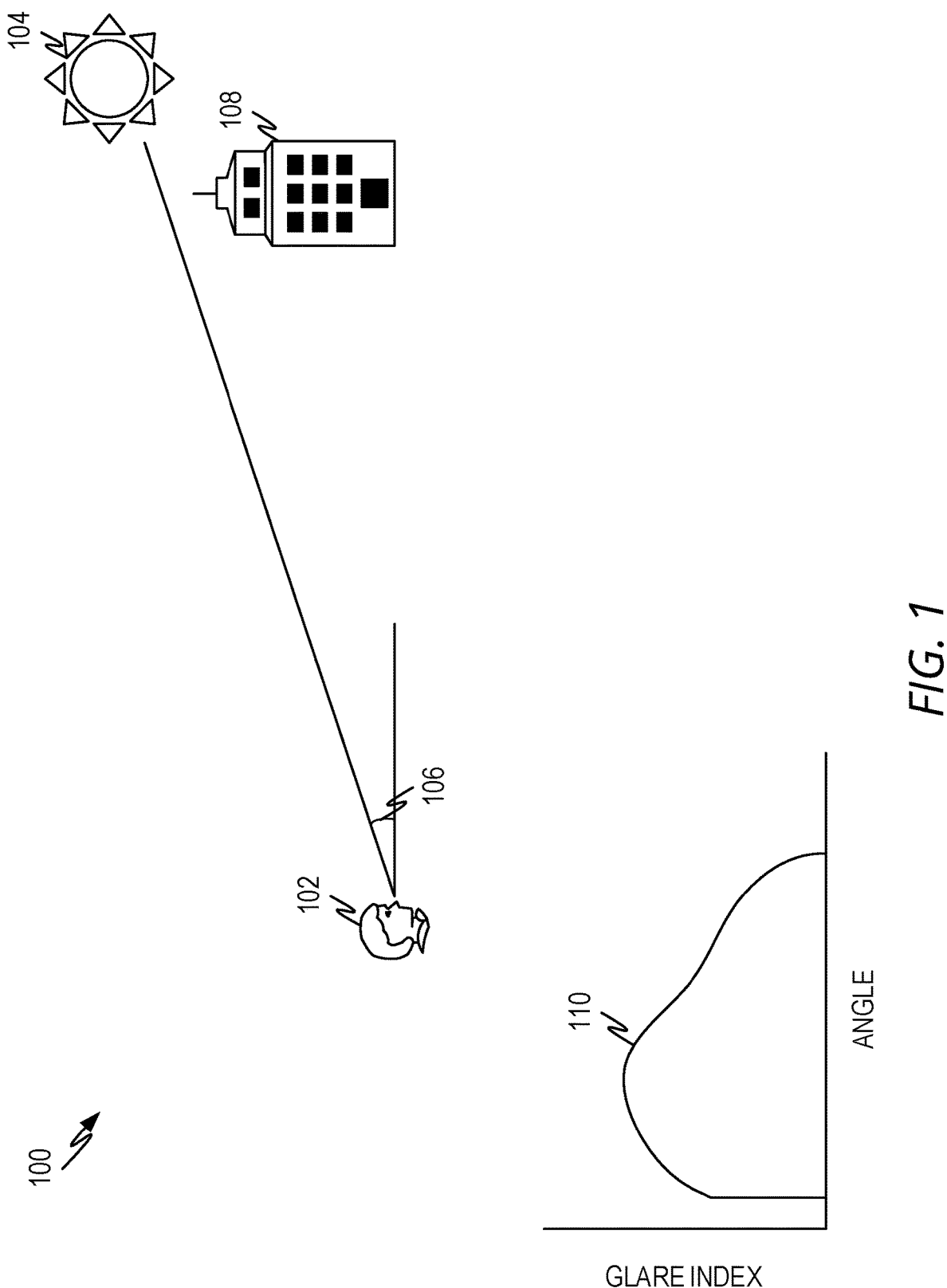
FIG. 1 illustrates a representative diagram illustrating sun glare according to some aspects of the present disclosure.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

Today, when people leave their office/home, they look at traffic to tell them what route to take. There is often little or no regard of where the sun is in the sky and the impact that can have on individuals and sensors (for example that collect data for self-driving vehicles). However, sun glare can be the cause of accidents and discomfort. For self-driving vehicles, the problem may be even greater as the sun glare may impede or eliminate the ability of the sensors to collect accurate data. The sun can blind users or sensors, thus creating a safety issue. Sun glare can also influence or increase traffic.

Embodiments of the present disclosure comprise systems that utilize sun glare information for navigation and other uses. In one embodiment, routes are calculated using sun glare as an input. For example, based on the starting location, the ending location and estimated time that the user/vehicle will be traveling a route between the starting and ending locations, a check can be performed to see if sun glare is likely along the route. If not, the route can be calculated without regard to sun glare. If so, then the route can be calculated to minimize the expected sun glare.

In another embodiment, while a user is navigating, the system can receive sun glare information and warn the user of impending sun glare. This allows a user to ask the system to calculate an alternative route or take other precautions to minimize the impact of the expected sun glare on the user. Self-driving vehicles can also utilize the information to automatically reroute or take other precautions when the predicted glare is expected to interfere with the sensor data collected from the sensors.

In another embodiment, sun glare information can be utilized by a digital assistant to help a user prepare for the expected glare. Many digital assistants have a proactive mode where they predict user behavior and/or actions and based on the predicted behavior and/or actions, interact with the user or take actions on behalf of the user. As an example, the digital assistant, having access to a user's calendar and location, can predict that the user will need to travel from a current location to the location where a meeting is to be held. Since the meeting is scheduled and the location of the user is known, the system can predict the time the user will need to leave to arrive at the meeting on time. The system can also calculate the expected sun glare along the route. If the system predicts that sun glare will occur, the system can inform the user of the expected glare and suggest preparations to make such as "Make sure you take your anti-glare glasses with you when you leave this morning. Sun glare is predicted for your 2 pm meeting." Additionally, or alternatively, as the time for the meeting draws near, the system can suggest alternative routes, alternative leaving time, and so forth. For example, "If you leave 10 minutes early, you can avoid the worst sun glare," or "I suggest you leave now and take the shown alternative route to minimize sun glare."

Machine learning is a field of study that gives computers the ability to learn without being explicitly programmed. Machine learning explores the study and construction of algorithms, also referred to herein as tools, that may learn from existing data and make predictions about new data. Machine learning can be utilized in embodiments of the disclosure to account for subjective user experiences, adjust for environmental factors, and turn sun position into a predicted glare index, and perform other functions as disclosed herein.

For users, sun glare is at least partly a subjective experience. For fixed environmental conditions (sun azimuth/elevation, obstructions, weather, and so forth), different users will experience different subjective sun glare index. Thus, embodiments of the present disclosure can utilize machine learning to predict how users will subjectively experience sun glare based on user characteristics. Additionally, or alternatively, machine learning can be utilized to predict how different self-driving vehicles (having different sensors, sensor arrangements, and so forth) will be impacted by sun glare created by a given set of environmental conditions.

Crowd sourcing or automated feedback can be used to collect sun glare information. This sun glare information can be utilized to train machine learning models, to warn users/self-driving vehicles of impending sun glare to allow them to take precautions. Embodiments can utilize sensors to collect automated feedback. Additionally, or alternatively, embodiments can ask the user to provide feedback on sun glare that has been experienced. Since glare intensity differs from person to person, embodiments, may ask the person during setup of the glare index insight, to rate images ranging from low to high glare and hence provide glare insight (high, medium, low) customized to the individual.

DESCRIPTION

FIG. 1 illustrates a representative diagram 100 illustrating sun glare according to some aspects of the present disclosure. Sun glare occurs when the sun 104 enters a user's 102 (or a sensor's) field of view. Thus, at a high level, sun glare can be expected when the angle of the sun 106 relative to the horizon falls within a designated range. As a representative example, a user's field of view is typically divided into "direct" and "peripheral" regions. These are further divided into a central region, a para central region, a macular region, a near peripheral region, a mid-peripheral region, and a far peripheral region. Although the exact angles between these regions vary somewhat from person to person, approximate angles can be specified as follows. The central region is about ±2.5° from the center. The paracentral region is about ±4° from the center. The macular region is about ±9° from the center. The near peripheral region begins about 4° from the center and ends about 30° from the center. The mid-peripheral region begins about 30° from the center and ends about 60° from the center. The far peripheral region begins about 60° from the center and ends between about 100° to about 110° from the center.

Most users are not troubled much by the sun being in the peripheral regions. However, as the sun approaches the central regions (macular, paracentral, central), sun glare becomes more of a problem. Thus, a curve can be plotted that maps the sun glare index vs. angle. Generally, as the angle of the sun approaches the center (e.g., where the user is looking), the sun glare index increases. As the angle sun increases from the center, the sun glare index decreases until it is not noticed by the user (e.g., falls to zero or near-zero) beyond some angle. In the context of this disclosure, sun glare index will refer to the user's or sensor's subjective sun glare reaction. The small chart in FIG. 1 illustrates a representative curve 110, where the angle is an off-axis angle and the glare index is the subjective user or sensor response to the sun glare.

Sensors will have a similar curve, however, their shape can be very different from a user's eye. The shape of the sensor curve will be influenced by how sensitive the sensor is to particular wavelengths sensed by the sensor as well as internal construction of the sensor, optics associated with the sensor, and so forth. Thus, a thermal sensor will have a very different response curve than an ultraviolet sensor. Some sensors, such as radar sensors of particular wavelengths may not be affected at all. Additionally, the shape of the curve as the sun moves off-axis (i.e., the angle between the center of the sensor and the sun increases) can be very different from a user's eye.

Additionally, environmental factors such as obstructions 108 between the sun and a user 102 or sensor, weather, pollution, and so forth can influence the shape of the curve. For example, as the sun goes behind an obstruction such as a building 108, the sun glare index can suddenly drop to zero. Obstructions include not only far objects such as buildings, trees, and so forth, but also near objects such as a sun visor in a vehicle, the top roof of a vehicle, and so forth.

In general, assuming no obstructions, the sun glare index peaks at zero off-axis angle (e.g., looking directly into the sun). However, in real-world situations, with obstructions, weather, pollution, and so forth, the peak may not be at a zero off-axis angle. For example, as the sun sinks on the horizon, even in the absence of weather and obstructions, the sun glare can become less intense due to atmospheric factors (reflection, refraction) and pollution. These can filter out some of the sun's intensity thus making the sun glare index lower than might otherwise be predicted based on the off-axis angle.

Although FIG. 1 illustrates a simple off-axis angle, in real-world situations, the sun glare index can depend on multiple angles, such as the sun azimuth and elevation. This is because obstructions, weather, environmental factors and so forth can vary based on both azimuth and elevation. Thus, the glare index response is more akin to a 3D surface that depends on azimuth and elevation of the sun, location of the user/sensor, obstructions, weather, atmospheric factors, and so forth. Embodiments described below can account for various factors at different points in their processes in order to efficiently utilize sun glare information as described herein.

Figure 2:
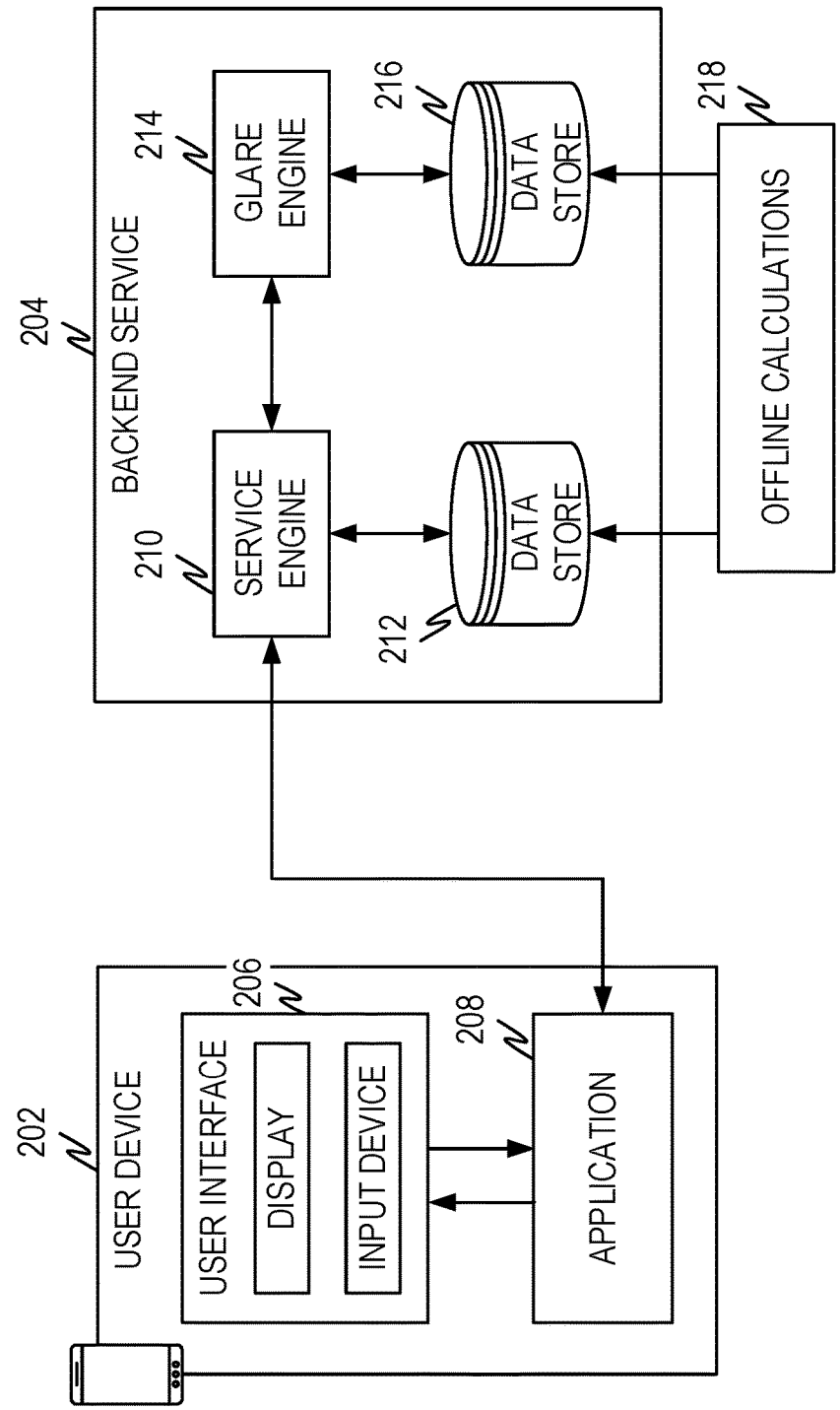
FIG. 2 illustrates a representative system architecture according to some aspects of the present disclosure.

FIG. 2 illustrates a representative system architecture 200 according to some aspects of the present disclosure. This system architecture is a general architecture where the sun glare calculations are done via a service, such as over a network. In this architecture, a user device 202 comprises a user interface 206 such as a display, one or more input devices, user interface controls, and so forth. An application 208 on the device 202 utilizes sun glare information and interacts with the user through the user interface 206.

The application 208 accesses a backend service 204 which comprises a service engine 210 and a glare engine 214. The glare engine 214 may access a data store 216 in order to calculate expected or actual glare index information. The glare index information can be utilized by the service engine 210 and other information, such as from a data store 212, in order to provide one or more services to the application 208 that utilize glare index information. Offline calculations 218 can be performed in some situations such as to train machine learning models, pre-calculate desired information and so forth.

Various examples are described in greater detail below in the context of a mapping service and a digital assistant.

Figure 3:
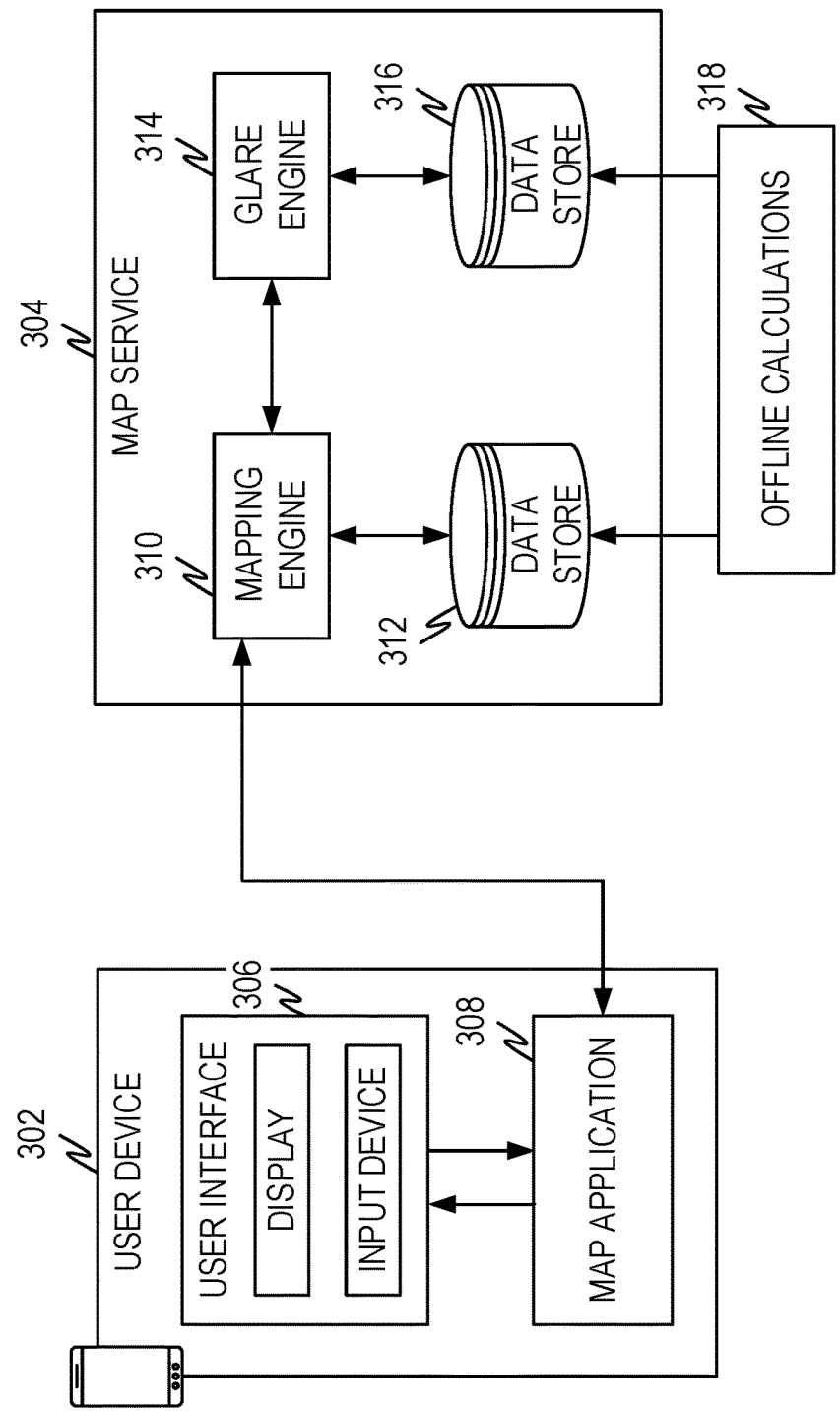
FIG. 3 illustrates another representative system architecture according to some aspects of the present disclosure.

FIG. 3 illustrates another representative system architecture 300 according to some aspects of the present disclosure. This is a representative architecture 300 to implement a mapping application and service to account for sun glare information as routing is accomplished.

In the representative architecture, the user device 302 comprises a mapping application 308 that utilizes a mapping service 304 to provide maps, routing and so forth to a user through the user device 302. The user device 302 can be a mobile phone, tablet, wearable, a Global Positioning System (GPS) unit, as well as a vehicle or other such user device where mapping is performed.

The user device 302 can comprise a user interface 306 (display, input device(s), controls, and so forth) and a mapping application 308. The mapping application 308 utilizes a mapping service 304 to perform some or all of the mapping and/or routing calculations and/or provide data for the mapping application 308. In alternative embodiments, the mapping application 308 can be a stand-alone application that incorporates some or all of the functionality provided by the mapping service 304.

In a representative example, the mapping service 304 can comprise a mapping engine 310 which can perform route calculation which minimizes one or more cost functions and/or maximizes one or more cost functions as described herein. For example, the cost function can include one or more of travel time, travel costs, energy saved, distance traveled, sun glare encountered along the route, and so forth. Utilizing such cost functions, the mapping engine can calculate one or more routes that minimize sun glare encountered and travel time. Any other individual cost or combination of costs can be minimized/maximized by the mapping engine 310.

When sun glare is to be utilized as part of a cost function, the glare engine 314 can calculate and provide sun glare information to the mapping engine 310 as described herein. Data utilized by the mapping engine 310 and/or glare engine 314 can be stored in data store 312 and/or data store 316 and/or retrieved from other source(s). Additionally, offline calculations 318 can perform pre-calculations that can help speed up the processes of the mapping engine 310 and/or glare engine 314. As will be apparent from the disclosure of the present application, there are many items that can be pre-calculated in order to speed up routing and/or sun glare calculations.

Figure 4:
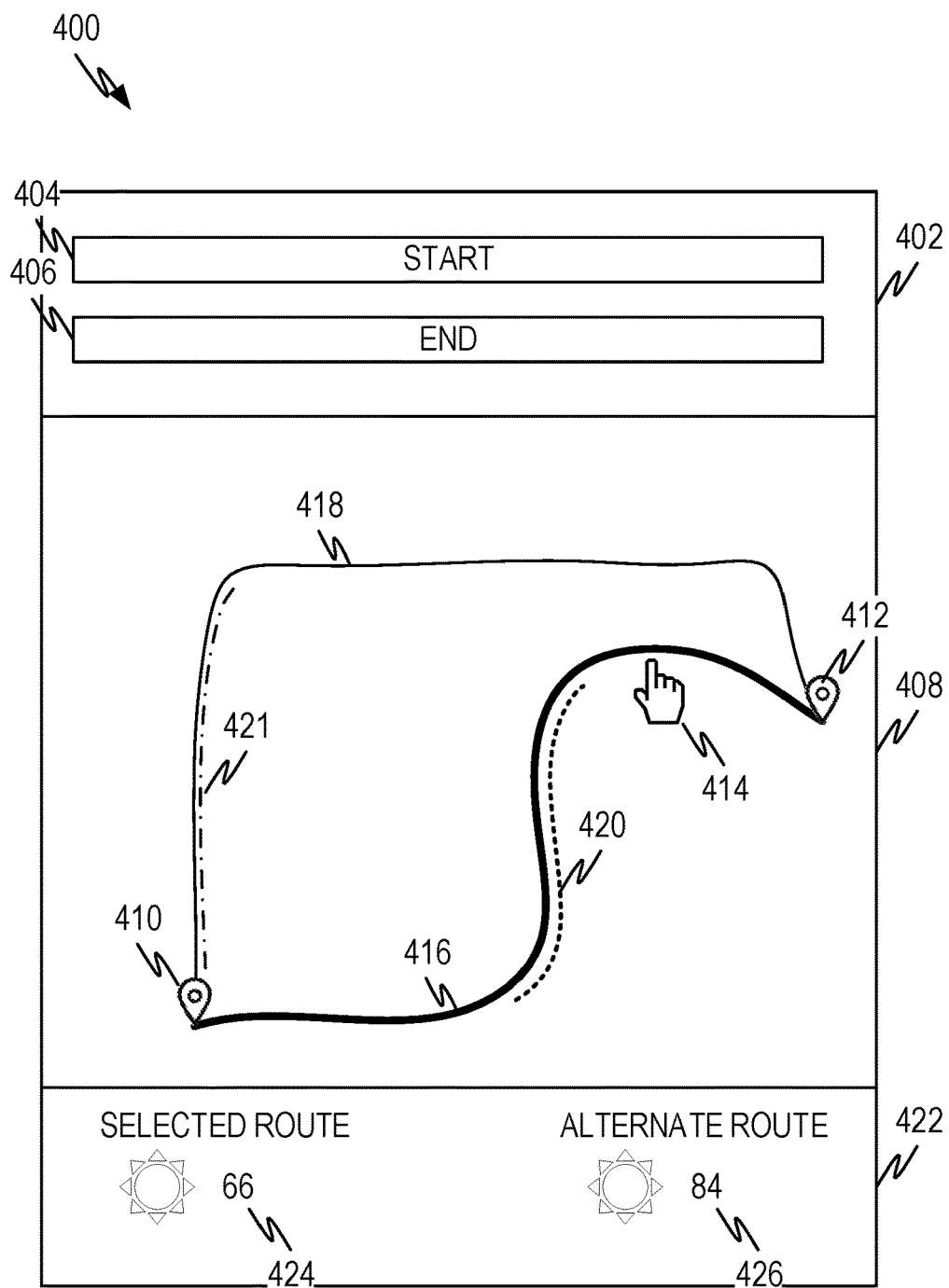
FIG. 4 illustrates a representative navigation route interface showing sun glare information according to some aspects of the present disclosure.

FIG. 4 illustrates a representative navigation route interface 400 showing sun glare information according to some aspects of the present disclosure. Such a user interface 400 can be presented on a user device as defined herein. The user interface 400 has three general areas. One area 402 comprises an area 404 where a user can input a starting location and another area 406 where a user can input an ending (also referred to as a destination or stopping) location. The starting and/or ending locations can also be obtained in ways that do not involve specific entry by a user. For example, a user's calendar or other user information may already indicate where a user is or will be headed. Similarly, a starting location can be obtained by using the user's current location, or other user information.

Once the starting location 410 and ending location 412 are known, the system can calculate one or more routes 416, 418 from the starting location 410 to ending location 412. These can be displayed to a user as illustrated. The display can overlay the routes on a map, satellite image, and/or other background. The system can display a visual indicator 420, 421 of the regions on the routes where sun glare is expected to be encountered. The visual indicators 420, 421 can comprise colors, color intensity, patterns, and so forth to give the user a sense of the intensity of the sun glare that will be encountered. The color, color intensity pattern, and so forth can vary from visual indicator to visual indicator as well as within a single visual indicator. One part of the visual indicator, such as 420 and/or 421 can be one color, color intensity, pattern, and so forth to indicate relatively lower sun glare expected and another part can be a different color, color intensity, pattern, and so forth to indicate relatively higher sun glare expected at a different point along the route. Different colors (yellow, red, and so forth) can intuitively give users a sense for the intensity of the sun glare that is expected. Additionally, or alternatively color intensity (dull yellow, bright yellow, and so forth) can also give users an intuitive sense for the expected sun glare intensity. Finally, patterns or other visual indicators can be utilized for users that cannot distinguish between colors, intensities, and/or so forth.

The mapping and/or routing results can be displayed in a second region 408 as illustrated or can be incorporated into one or more of the other regions.

A user can select one or more routes 414 in order to display additional information regarding the route such as travel time, total distance traveled, average expected speed and so forth. Additionally, or alternatively, sun glare information can be displayed for the routes either when selected or as part of a list of information about the routes. For example, in FIG. 4, area 422 illustrates that the selected route has a sun glare index of 66 while the alternative route has a sun glare index of 84. The displayed sun glare index can be a measure of the average sun glare index, the peak sun glare index, and/or some other sun glare index that allows the user to get a sense of which route may be the better route to choose.

In some user devices and/or embodiments, not all the information may be displayed at the same time. For example, for GPS devices, it is often common for the user to enter the starting location and ending location on one screen. The device then calculates a route to minimize one or more parameters that have been set by the user. Thus, a user can tell the device to calculate the quickest travel time that avoids toll roads and stays off major highways. Sun glare can be one of the configurable parameters that the user can select if desired.

GPS devices often calculate and display a single route while allowing a user to recalculate routes if desired. Thus, before navigating or while navigating the user can ask the device to calculate an alternative route, which the device will do according to configured parameters. Such recalculations can have different cost function(s) than the original route calculations. Thus, the original calculation may be to minimize travel time, while the recalculation can be to avoid the sun glare the user is experiencing.

While navigating, such as when receiving turn-by-turn directions, when seeing a representation of current location in the context of a route, and so forth, sun glare index information can be displayed. For example, while navigating, when the system predicts that sun glare is ahead, the system can display a warning or indication to the user informing them of the expected sun glare. The warning can include one or more of: 1) warning text; 2) recommended actions; 3) sun glare information (intensity, duration, and/or so forth); and/or other information that can help the user prepare for the sun glare and/or mitigate the sun glare impact.

Actions to mitigate the sun glare can include conventional actions such the user placing an obstruction between the user and the sun, such as a sun visor, or putting on anti-glare glasses as well as other more non-conventional actions. For example, as technology in vehicles improves, a heads-up display (HUD) can be utilized in several fashions. One embodiment is an over-the-eye type display that can project to the user a picture that live-streams what the user would see through the windscreen of the vehicle. Because the user is looking at a projection (e.g., on a graphic screen) instead of directly looking in the direction of the sun, technology can be utilized to mitigate the sun glare. Mitigation responses can include adjusting brightness to reduce the perceived sun glare, removing the sun from the projection through graphics and/or signal processing, placing an obstruction or filter over the sun to reduce the perceived sun glare, and other such actions.

Rather than an over-the-eye type display, the HUD can project the live screen in different locations. For example, a display located on the dashboard or other location that the user can look at without having to look at the sun can be used to project the live stream. A user can be looking "away" from the windscreen but still see everything the user would see looking out of the windscreen. The same mitigation effects can be applied to the display such as adjusting brightness to reduce the perceived sun glare, removing the sun from the projection through graphics and/or signal processing, placing an obstruction or filter over the sun to reduce the perceived sun glare, and other such actions.

In still another embodiment, if the windscreen has the ability to reflect information and other displayed objects such as when HUD information is projected on the windscreen to overlay what the user sees outside or if the windscreen can directly display such information, an electronic obstruction can be displayed over the location of the sun to act as a virtual "sun visor" to reduce the sun glare.

In these embodiments, the expected sun glare index and/or actual sun glare index as measured in real time or near real time can be used to drive the mitigation actions of such technology. When the expected or actual sun glare index exceeds a threshold, the system can begin to take actions such as adjusting the brightness of the display, removing the sun from the display, placing an obstruction or filter over the sun and so forth. Thus, even if the sensors, camera, and so forth that are used to create HUD live stream and other information are prone to sun glare, the effects can be mitigated. These embodiments can be applied in conjunction with any of the other aspects of the disclosure described herein.

From the above, it should be evident that not all the information illustrated in FIG. 4 needs to be presented at the same time or in the same fashion as illustrated. User interfaces of embodiments disclosed herein can comprise any combination of elements illustrated in FIG. 4 such as displayed route(s) with associated sun glare index information, sun glare warnings, and/or other information.

Figure 5:
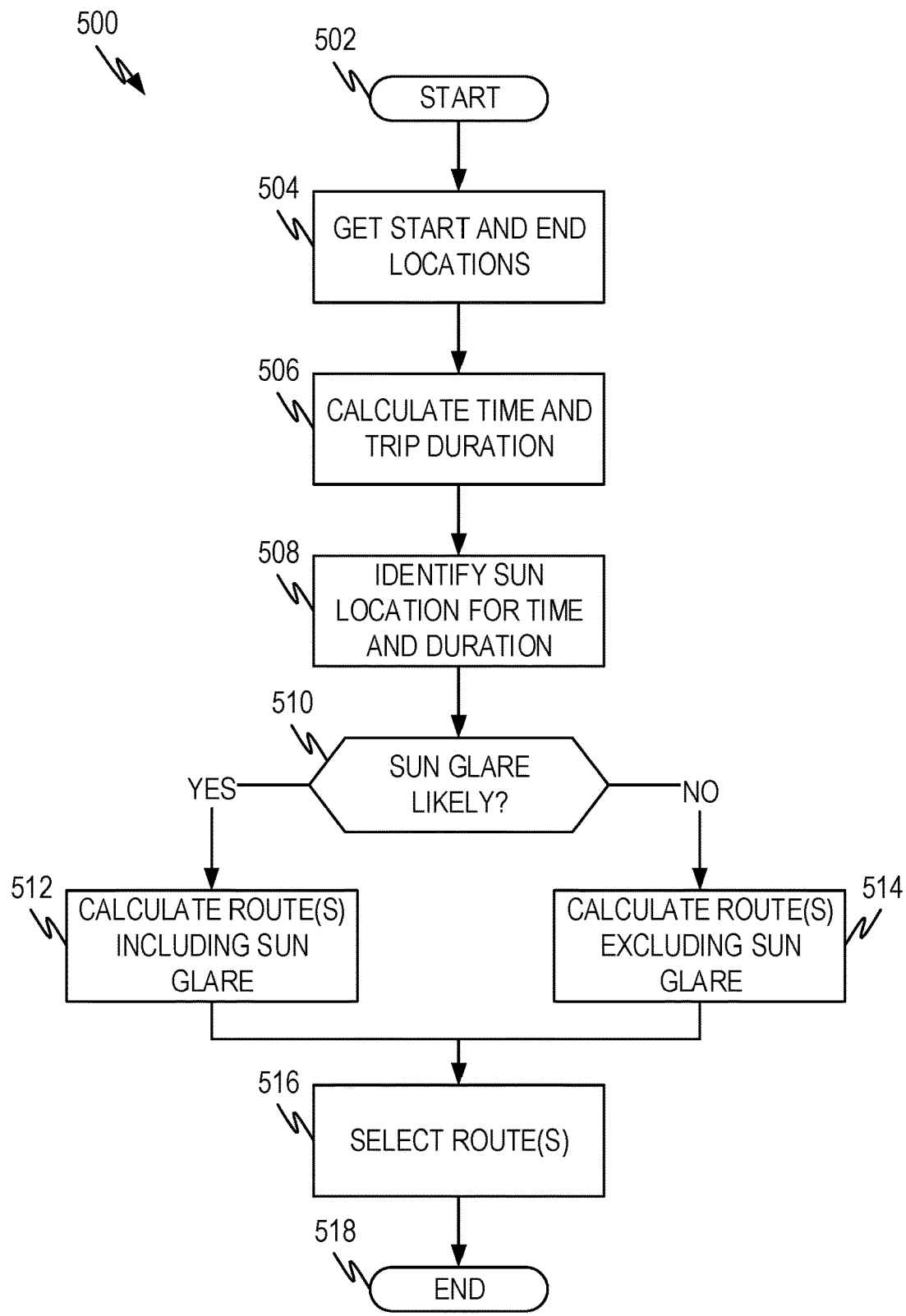
FIG. 5 illustrates a flow diagram according to some aspects of the present disclosure.

FIG. 5 illustrates a flow diagram 500 according to some aspects of the present disclosure. Whether a user and/or self-driving vehicle will experience sun glare is a time, location and direction dependent phenomenon. Thus, during a particular period of time a particular route may be free of sun glare while at other times the route may experience severe sun glare. This means that when calculating a route from a starting to ending location embodiments of the present disclosure need not always take sun glare into account. The flow diagram of FIG. 5 illustrates an embodiment where sun glare is not always taken into account. This can be useful, for example, where calculating a route taking sun glare into account takes more computing resources than calculating a route without sun glare information. The routing methods utilized will identify whether it is useful to utilize two separate routing methodologies or simply modify one. Examples of both are discussed below.

The flow diagram begins at operation 502 and proceeds to operation 504 where the starting and ending locations are identified. These can be received by direct entry from a user or from a pre-determined plan (such as in the case of a self-driving vehicle). Alternatively, these can be inferred from other information such as a user's calendar, the current location of the user, user device, vehicle, and so forth, an application indicating where a user desires to go, or in some other fashion. Thus, the starting and ending locations can be explicitly entered, inferred from other information, or a combination thereof.

Operation 506 identifies an estimated time and duration of the trip. This is so the system can identify during what period of time the user will be navigating between the starting and ending locations. An estimate can be derived first identifying an estimated starting time. This can be identified either by explicitly asking a user what time the user expects to start the trip, by inferring a start time from context or other information, or a combination thereof. For example, a user's calendar may indicate a time when a user must be at a meeting. This can be used to infer a time when the user must leave the starting location to arrive at the designated location on time. As another example, if the user is entering a desired destination in a GPS system or mapping application, it can be inferred that the user desires to navigate to the desired destination from the current location immediately, unless contrary information is entered. As another example, a user may indicate a time to arrive at a desired destination, a time to leave a starting location, and so forth.

The trip duration can be estimated by identifying the distance between the starting and ending locations and multiplying by a factor to account for the fact that roads seldom go directly between two points. The calculated time and duration can be approximate and do not need to be exactly accurate as explained below. On the other hand, the more accurate they are, the better the prediction can be.

Once the time and duration are estimated, execution proceeds to operation 508 where the sun azimuth and elevation for the location of the trip and the time and duration of the trip are calculated. Given a time and a location, the azimuth and elevation of the sun can be calculated. The equations to calculate the azimuth and elevation of the sun for a given time and location are well known. Table 1 below illustrates representative calculations for Bellevue, Wash. on Apr. 3, 2018. The azimuth is given relative to magnetic north (i.e., magnetic north is 0 degrees).

TABLE 1

Azimuth and Elevation vs Time

| Time | Az | El |
|---|---|---|
| 06:00 | 55 | −8 |
| :15 | 58 | −5 |
| :30 | 61 | −3 |
| :45 | 64 | −1 |
| 07:00 | 67 | 2 |
| :15 | 69 | 5 |

TABLE 1-continued

Azimuth and Elevation vs Time

| Time | Az | El |
|---|---|---|
| :30 | 72 | 7 |
| :45 | 75 | 10 |
| 08:00 | 78 | 12 |
| :15 | 81 | 15 |
| :30 | 83 | 17 |
| :45 | 86 | 20 |
| 09:00 | 89 | 22 |
| :15 | 93 | 24 |
| :30 | 96 | 27 |
| :45 | 99 | 29 |
| 10:00 | 103 | 31 |
| :15 | 106 | 33 |
| :30 | 110 | 36 |
| :45 | 114 | 37 |
| 11:00 | 118 | 39 |
| :15 | 122 | 41 |
| :30 | 127 | 43 |
| :45 | 132 | 44 |
| 12:00 | 137 | 45 |
| :15 | 142 | 46 |
| :30 | 147 | 47 |
| :45 | 153 | 48 |
| 13:00 | 158 | 48 |
| :15 | 164 | 48 |
| :30 | 169 | 48 |
| :45 | 175 | 47 |
| 14:00 | 180 | 47 |
| :15 | 185 | 46 |
| :30 | 190 | 45 |
| :45 | 195 | 43 |
| 15:00 | 200 | 42 |
| :15 | 204 | 40 |
| :30 | 209 | 39 |
| :45 | 213 | 37 |
| 16:00 | 217 | 35 |
| :15 | 220 | 33 |
| :30 | 224 | 30 |
| :45 | 227 | 28 |
| 17:00 | 231 | 26 |
| :15 | 234 | 24 |
| :30 | 237 | 21 |
| :45 | 240 | 19 |
| 18:00 | 243 | 16 |
| :15 | 246 | 14 |
| :30 | 249 | 11 |
| :45 | 251 | 9 |
| 19:00 | 254 | 6 |
| :15 | 257 | 4 |
| :30 | 260 | 1 |
| :45 | 262 | −1 |

Given the estimation discussed below in operation 510, the accuracy of the time and location may be coarse. For example, an average location (between the starting location and ending location) can be utilized as the location parameter.

Once the location for the sun is known for the location, time and duration of the trip, an estimate can be made as to whether sun glare is likely. If the sun is above a threshold value in elevation, there will be no sun glare independent of which direction a user is facing. The threshold can be set based on the accuracy of the location and time utilized. For example, suppose the time estimate for an average location described in the table above is between 1 pm and 2 pm. During these times, the sun will be at an elevation of between 48 and 47 degrees and the likelihood of sun glare is very small (discounting things like reflections from buildings). On the other hand, for the location shown in the table above, if the trip is between 7 pm and 8 pm, the likelihood of sun glare is much greater, depending on the direction of travel.

Given no route has been calculated at this point, operation 510 can estimate the likelihood of sun glare based on a threshold for sun elevation that corresponds to the sensor of concern or eye of the user. If the curve of glare index vs. elevation is known or can be estimated (e.g., FIG. 1:110) the threshold can be set based on a desired glare index. The glare index that is likely to bother a user can be estimated and then a corresponding elevation angle determined from the curve.

Alternatively, it is unlikely that a user will be bothered by sun glare when the elevation angle is outside a particular region of the field of view of the eye. Thus, in one embodiment the threshold can be set to be the limit of the central region (about +2.5°). In another embodiment, the threshold can be set to be the limit of the paracentral region (about +4°). In yet another embodiment, the threshold can be set to be the limit of the macular region (about +9°). Sun glare can be declared as likely when the elevation of the sun is equal to or below the selected threshold.

For sensors, such as on self-driving vehicles, a curve can be generated for a particular sensor suite that plots sensor degradation vs. sun elevation angle. This can be accomplished as described by measuring the response of the sensor suite as the sun elevation angle changes. A limit on the degradation can be set based on the performance of the self-driving vehicle and/or safety concerns. This limit can then be translated into a threshold elevation angle. These tests can be performed with the sensor suite directly facing the sun so that there is no off-axis loss to consider. Sun glare can be declared as likely when the sun is equal to or below the selected threshold.

Other mechanisms can be used to determine the likelihood of sun glare. For example, in one embodiment, rather than set a threshold, a representative route can be calculated between the starting and ending points. Sample points can be taken along the route and the time the vehicle or user is expected to be at the sample point and the location of the sample point can be used to calculate the sun azimuth and elevation. The direction of travel at the sample point can allow the system to estimate the likelihood of sun glare, by comparing the direction of travel to the azimuth of the sun, by comparing the elevation of the sun to a threshold or both. If the azimuth of the sun is outside a threshold from the direction of travel, sun glare will be unlikely independent of the elevation of the sun. Similarly, as previously described, if the sun is above a threshold elevation sun glare is unlikely independent of the direction of travel.

If sun glare is likely, execution proceeds to operation 512 where the route is calculated taking into account sun glare information. Several routing methods exist that minimize multiple cost metrics or a linear combination of multiple cost metrics. These methods are known to those of skill in the art. For example, Robert Geisberger, Moritz Kobitzsch and Peter Sanders describe a method of calculating a route that accounts for a customizable linear combination of two different metrics in "Robert Geisberger, Moritz Kobitzsch, and Peter Sanders. Route planning with flexible objective functions. In Proceedings of the 12th Workshop on Algorithm Engineering and Experiments (ALENEX'10), pages 124-137. SIAM, 2010." Other algorithms are also described in Hanna Bast, Daniel Delling, Andrew Goldberg, Matthias Muller-Hannemann, Thomas Pajor, Peter Sanders, Dorothea Wagner, and Renato F. Werneck, Route Planning in Transportation Networks, arXiv:1504.05140v1 [cs.DS], 20 Apr. 2015. Both of these papers are incorporated herein by reference.

Operation 512 can utilize a method, such as those described above, that minimizes multiple cost metrics or a linear combination of two cost metrics to calculate a route to minimize sun glare along the route. The metrics are selected to be the glare index and another metric such as travel time, distance traveled, and so forth. For example, in the "Route planning with flexible objective functions" paper, the authors illustrate an example that minimizes travel time and monitory cost. The method of the paper puts together different directed edges to form a route. The travel time was computed from the length of an edge and the average travel speed. For the cost metric, the authors calculated the work to move a standard car and factored in fuel prices to produce the work over the length of the directed edge. To minimize sun glare and travel time, travel time can be computed as described in the paper (length of an edge and the average travel speed). The sun glare metric can be calculated by the estimated time the vehicle/user arrives at the directed edge, the time to traverse the directed edge, and the resultant sun glare index information (e.g., as calculated in FIG. 7 below). This will give a sun glare value for each directed edge that is a candidate for inclusion into the route. The two metrics can then be combined as described in the paper.

If operation 510 determines that sun glare is unlikely, execution can proceed to operation 514 where the route can be calculated without regard to sun glare. This can be accomplished, for example, by using a different routing method that does not account for sun glare or using the same method as in operation 512 with the sun glare metric set to zero cost.

Operation 516 selects one or more routes to utilize or present to the user as options, depending on the embodiment. Operation 516 can select the route(s) based on the total cost for the calculated routes. Thus, the lowest cost route can be selected as the "primary" route and, if other routes are selected, the next N lowest cost routes can be selected as "alternate" routes.

The flow diagram ends at operation 518.

The flow diagram in FIG. 5 can also be utilized by self-driving vehicles.

Figure 6:
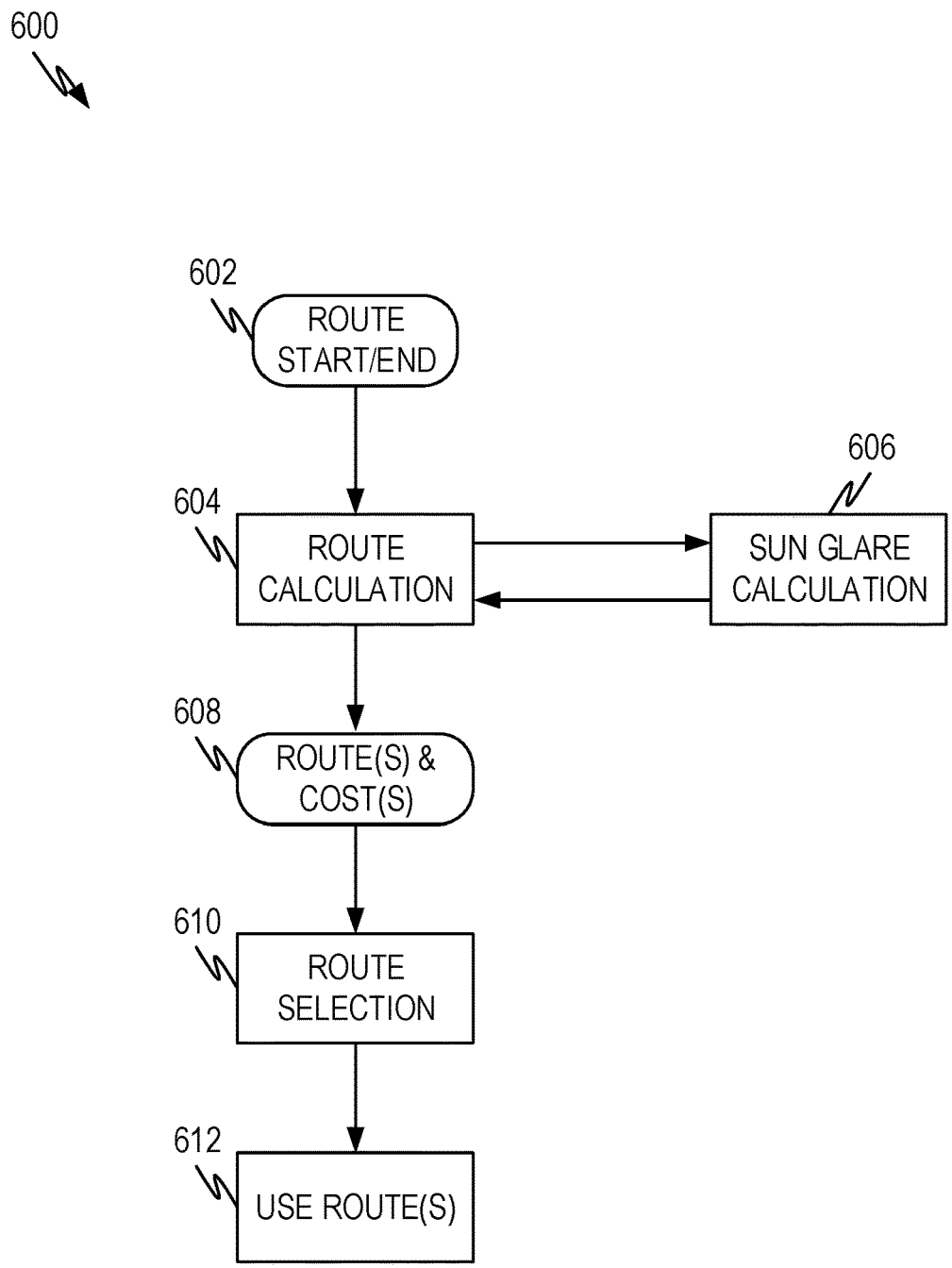
FIG. 6 illustrates an architecture diagram according to some aspects of the present disclosure.

FIG. 6 illustrates an architecture diagram 600 according to some aspects of the present disclosure. This diagram illustrates how routes may be calculated in general using sun glare information in some embodiments. The architecture 600 can be utilized, for example, to implement the method illustrated in FIG. 5. The architecture takes as an input 602 where the route start/end locations are identified. These can be identified using any of the mechanisms that are described herein. Additionally, the start time and/or duration is identified as described.

The route calculation is performed by route calculator 604 using a method that allows for incorporation of the sun glare metric to be minimized. This can be performed using a method that minimizes multiple cost metrics as described herein. The sun glare metric is calculated by the sun glare calculator 606 as described below. The sun glare calculator 606 can be the same as the sun glare engines previously discussed.

The result is one or more routes and the associated costs as illustrated by output 608. The route selector 610 then selects one or more routes that have a minimum cost for the sun glare and/or other minimized costs. The route(s) are then used in 612 by the user device(s) as described herein.

Figure 7:
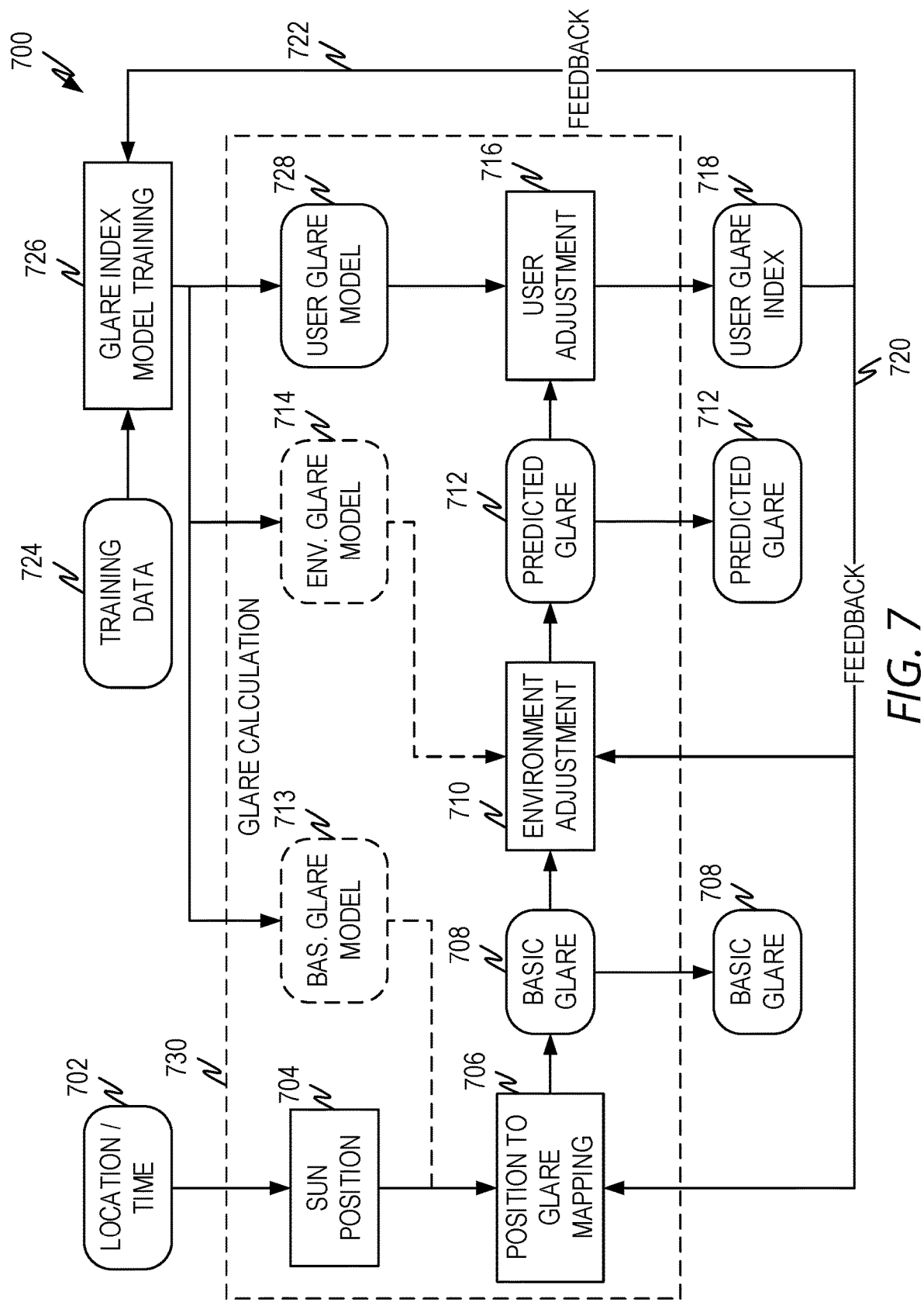
FIG. 7 illustrates a representative flow diagram to calculate sun glare information according to some aspects of the present disclosure.

FIG. 7 illustrates a representative flow diagram 700 to calculate sun glare information according to some aspects of the present disclosure. The flow diagram 700 illustrates how sun glare index information can be calculated at various levels of accuracy for the different aspects of the various embodiments herein.

As noted above, sun glare is dependent upon the time of day, the day of the year, the year, and the location. Thus, to calculate the sun glare index, the time and the location is input into the sun glare index calculation 730. In 704 the basic sun position is calculated according to well-known methods.

Once the sun position (e.g., azimuth and elevation for the input location), to obtain a basic sun glare index, a mapping between sun position and basic sun glare index is performed in 706. This can be performed in a variety of ways. For example, if a curve/surface for sun glare index vs. sun position as discussed in FIG. 1 has been created, the mapping can be used to identify the sun glare index. Additionally, or alternatively, a trained machine learning model 713 can be used to map sun position to sun glare index. In the case of a trained machine learning model 713, the model 713 can be trained to calculate the basic sun glare index using the sun position (azimuth and/or elevation) alone or using the sun position and the direction of travel. Training of machine learning models is discussed below.

In still other situations, one or more thresholds can be set, and the elevation and/or azimuth of the sun position compared to the thresholds and, based on which threshold is exceeded, a basic sun glare index can be obtained. Taking the sun elevation as an example, a basic sun glare index may depend on whether the sun elevation is in the central, paracentral, or macular region of the eye field of view. For example, a threshold set at 2.5° for the central region, 4° for the paracentral region and 9° for the macular region. Below the central region threshold, the sun glare index is set to a first value. Between the central region threshold and the paracentral region, the sun glare index is set to a second value. Between the paracentral and macular region, the sun glare index is set to a third value. Above the macular region threshold, the sun glare can be taken as minimal or nonexistent. In this methodology, the central sun glare index being larger than the paracentral and the paracentral sun glare index being larger than the macular sun glare index.

The sun glare is also dependent on the azimuth of the sun position as compared to the direction of travel (when known). In some mappings the azimuth can be taken into account and in some the system can calculate the sun glare index for the azimuth of the sun position, thus taking the direction of travel as directly along the azimuth of the sun. Examples of when setting one or more thresholds is useful have previously been explained such as when it is desired to get a quick calculation of whether sun glare is even a possibility. Thus, one or more thresholds can be set on the azimuth of the sun position and if the azimuth compared to the direction of travel is above a certain threshold, the basic sun glare index can be set to zero or some nominal value.

Once the basic sun glare index 708 is calculated, it can be utilized as shown or further adjusted for environmental factors 710. Environmental factors can comprise at least one of obstruction adjustment, weather adjustment and atmospheric adjustment. Obstructions include anything between the user or sensor and the sun. Obstructions tend to fall into two categories, near obstructions and far obstructions. Near obstructions are those either caused by or within the vehicle or other conveyance, such as a sun visor, the roof of a car, and so forth. They can also include items worn by the user such as a hat, glasses, and so forth. Far obstructions are those that surround the vehicle or user and include buildings, trees, mountains, and so forth.

Models created to model obstructions typically account for far obstructions since these are predictable, well known, and change slowly over time, if at all. The locations, height, shape and so forth of buildings, landscape, mountains and such are known. It takes time to build a building, grow a tree, and so forth so they change slowly. Near obstructions are unpredictable and change quickly, thus most obstruction models do not take these into account.

Obstruction models can be built and utilized to model shadowing effects. When a location falls into a shadow, the sun is obstructed, and sun glare does not occur (discounting reflections off buildings and so forth). Methods exist and are well known to calculate a shadow factor as part of the sun position calculation. The shadow length is then calculated by multiplying the shadow factor by the object height. The direction of the shadow is at an azimuth 180° from the sun azimuth. The width of the shadow can be calculated by determining the width of the obstruction at an angle 90° to the sun azimuth. The location can then be compared to the shadow to determine whether the location falls into the shadow. Other such geometric methods exist.

Weather adjustments can be made based on two sets of data. Predicted or historical weather can be used to determine the likelihood of weather that would obscure the sun (clouds, rain, and so forth) for some predicted time into the future. Current weather conditions can be used to identify whether the weather obscures the sun for current conditions. Predicted and/or historical weather data is available from numerous sources. Likewise, current weather conditions can be gathered as feedback from users or other vehicles, from a current weather feed, and other sources.

Atmospheric models are available to account for things like refraction that can reduce or eliminate sun glare. Pollution, dust, and other atmospheric conditions tend to cause the sun glare to be reduced when the sun travels through an appreciable portion of the atmosphere. Often, just before the sun sinks over the horizon, it is much less intense than a few minutes before due to atmospheric conditions. Calculations for how much refraction occurs and/or how much atmosphere the sun travels through are well known. A factor for pollution content, dust and other atmospheric factors can be applied based on these calculations to further reduce the basic glare index. Such factors are known or can be determined experimentally.

Rather than utilize the models above, some embodiments can utilize one or more trained environmental glare machine learning models 714 to convert the basic glare index 708 into a predicted glare index 712.

Obstruction, weather and/or atmospheric factors tend to be negating factors for sun glare and, in some embodiments, are applied only when sun glare is predicted to be a factor. For example, if the basic sun glare index 708 is low or non-existent, it may not be useful to go through the additional calculations to identify whether obstructions will further negate the sun glare index, whether weather is blocking the sun, and/or whether atmospheric dust and/or pollution refract the sun and reduce the sun glare. Thus, whether and to what extent environmental corrections are applied may be based on the value of the basic sun glare index 708. When the basic glare index is below a threshold value, all or part of the environmental adjustment 710 can be skipped and, if all environmental adjustments 710 are skipped, the basic glare index 708 used as the predicted glare index 712.

In other situations, it is not necessary to go through the calculations of environmental adjustment 710 because the increase in accuracy is not worth the tradeoff for the additional computation time. For example, if devices have lower computational power it may be desirable to eliminate some or all of the more computationally expensive environmental adjustment factors in order to reduce the time the device utilizes to perform its desired functions, such as route calculation.

Finally, since sun glare tends to be a subjective experience, the predicted sun glare index 712 can be further adjusted by subjective user factors in order to obtain a user glare index 718. One method to accomplish this is through the use of a trained machine learning model for user glare index 728. Such an approach can account for the variability between users in how bothered they are by sun glare. As explained below, the user glare index model 728 can be trained based on individual users, based on user cohorts (a group of users that have one or more common features or characteristics), or for all users. The user adjustment process 716 inputs the predicted glare 712 to the trained user glare index model 728 and receives the user glare index 718.

The user glare index model 728, the environmental glare adjustment model 714 and the basic glare model 713 to the extent the latter two are used, are trained in an offline glare index model training process 726 using training data 724 as described below.

Additionally, when any of the glare index information is utilized 708, 712, 718, feedback on the correctness of the glare index 720 and/or 722 can be utilized to update the appropriate machine learning model and/or adjust parameters of the glare index calculations such as the position to glare mapping 706, the environmental adjustment 710 if these are not implemented using machine learning models. For example, feedback may cause one or more of these glare index calculations to adjust thresholds or other parameters in order to better adapt the calculations to the glare index.

Figure 8:
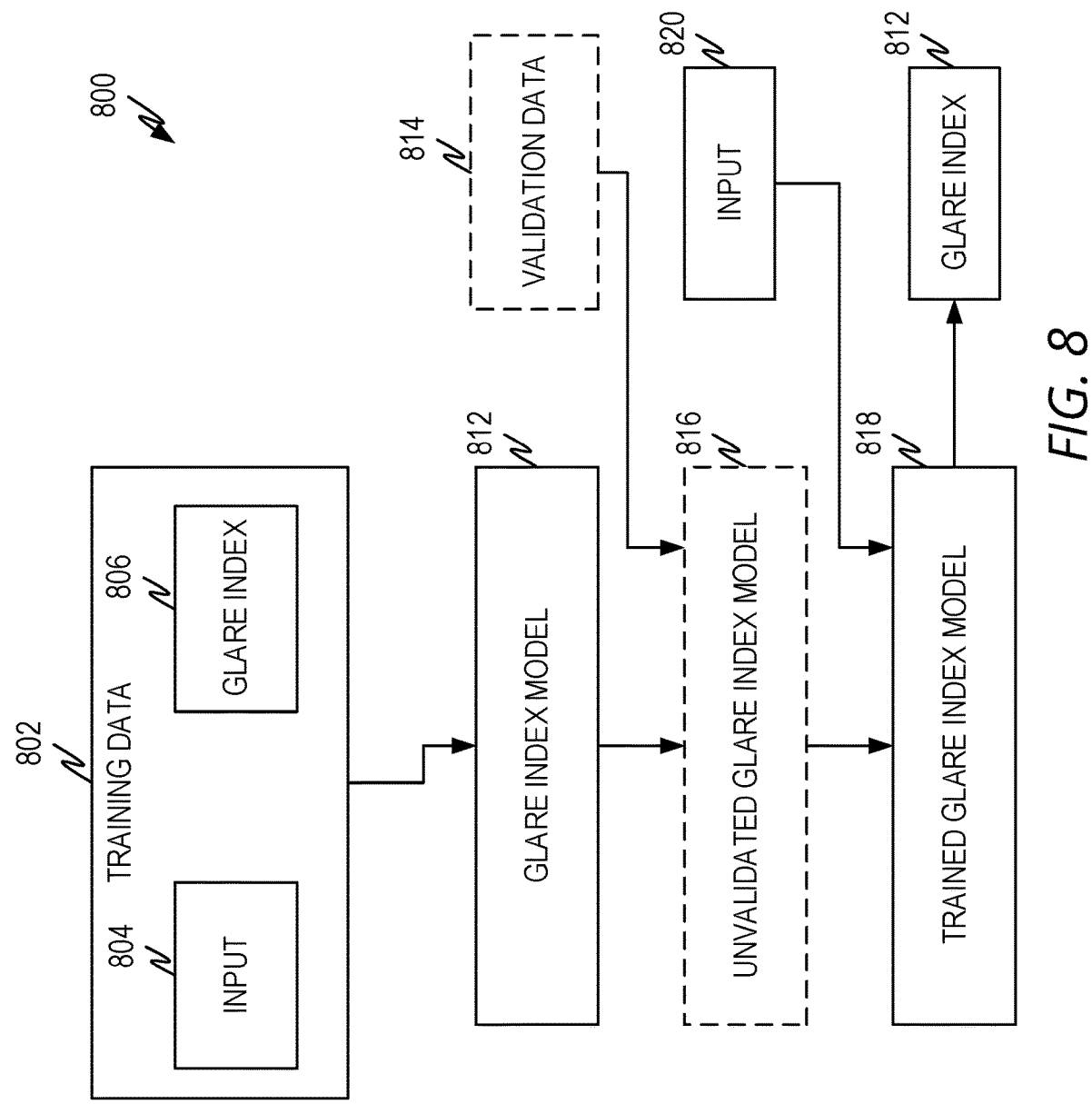
FIG. 8 illustrates a representative flow diagram for training a machine learning model according to some aspects of the present disclosure.

FIG. 8 illustrates a representative flow diagram 800 for training a machine learning model according to some aspects of the present disclosure. The diagram, with different training data, can be used to illustrate how any of the machine learning models disclosed herein can be trained. Such machine-learning tools operate by building a model 818 from example training data 802 in order to make data-driven predictions or decisions expressed as outputs or assessments 812. For the basic glare model 713, the output is the basic glare index 708. For the environmental glare model 714, the output is the predicted glare index. For the user glare model 728, the output is the user glare index 718.

In general, there are two types of problems in machine learning: classification problems and regression problems. Classification problems aim at classifying items into one of several categories (for example, is this object an apple or an orange?). Regression algorithms aim at quantifying some items (for example, by providing a value that is a real number). In some embodiments, example machine-learning algorithms provide the mapping from the sun position to the basic glare index, the mapping from a basic glare index to a predicted glare index, and/or the mapping from the predicted glare index to the user glare index. The machine-learning algorithms utilize the training data 802 to find correlations among identified features in the data that affect the mapping from the input to the output. In supervised learning, the training data has the input 804 as well as the desired output 806 that the model should generate using the input 804. In unsupervised learning, the desired output 806 that corresponds to the input is not available. Different models use supervised and/or unsupervised learning.

With the training data 802, the appropriate model 812 is trained at operation 810. The training data 802 will depend on what model is being trained. For the basic glare model, the input 804 will be the sun position and, in some embodiments, direction of travel. The output will be the basic glare index 708. For the environmental glare model 714, the input will be the basic glare index and one or more of the environmental adjustment parameters such as the location, obstruction data, weather data, and/or atmospheric conditions. In the case of the environmental glare model 714, a single model can be created for all environmental parameters or individual models can be created for the individual environmental adjustments (obstruction, weather, atmospheric). For the user glare model, the input is the predicted glare index along with user information such as different user characteristics, which user cohort the user falls into, and so forth.

In the case of sensors, such as a sensor suite on a self-driving vehicle, the training data can be similar for the basic glare model and the environmental glare model. The user glare model, however, would be replaced by a model that is trained using sensor information rather than user information. In this sense, sensor information can be more detailed information about the various sensors utilized by a self-driving vehicle (so that the model can be trained for a particular sensor or group of sensors) or the model can be trained based on the vehicle itself, such as by identifying which vehicle type/model/make the training data applies to.

Training data can be collected in a variety of ways. For example, initial training data may be less accurate data calculated based on sun position models, expected glare index curves such as shown in FIG. 1 based on the field of view of the user's eye, sensor field of view and/or sensor characteristics. With such basic information or with an experimental sensor vs. glare curve generated as discussed in conjunction with FIG. 1 above, the basic glare information can be identified. This basic glare information can then be combined with feedback as discussed herein to get input/output data point pairs for training data. The training data can be aggregated for particular users, particular user cohorts, all users, particular sensors, particular combination of sensors, particular self-driving vehicles, and so forth to generate trained models for use with the corresponding input groups. This training data can then be used to train the models as described herein.

After the trained glare index model 812 is produced, a validation operation may be performed in some instances. Validation involves taking a set of annotated data 814 and using the trained glare index model 812 to produce an output for each of the data points in the validation data set 814. In the validation process 816, the output for the set is compared to the annotations which describe what should have been output from the glare index model 812. Statistics can be evaluated to see how well the trained glare index model 812 operates and, if the accuracy is acceptable, the trained glare index model 812 can be said to be validated 618. Otherwise, additional training can be performed.

When the trained glare index model 812 or 818 is used to perform an assessment, new data 820 in the form of appropriate input for the model is provided as an input to the trained glare index model 818, and the glare index model 818 generates the assessment such as answer 812 as output. For purposes of this disclosure, no distinction is made between the invalidated but trained glare index model 812 and a validated and trained glare index model 818. They are both referred to herein as a trained model.

Figure 9:
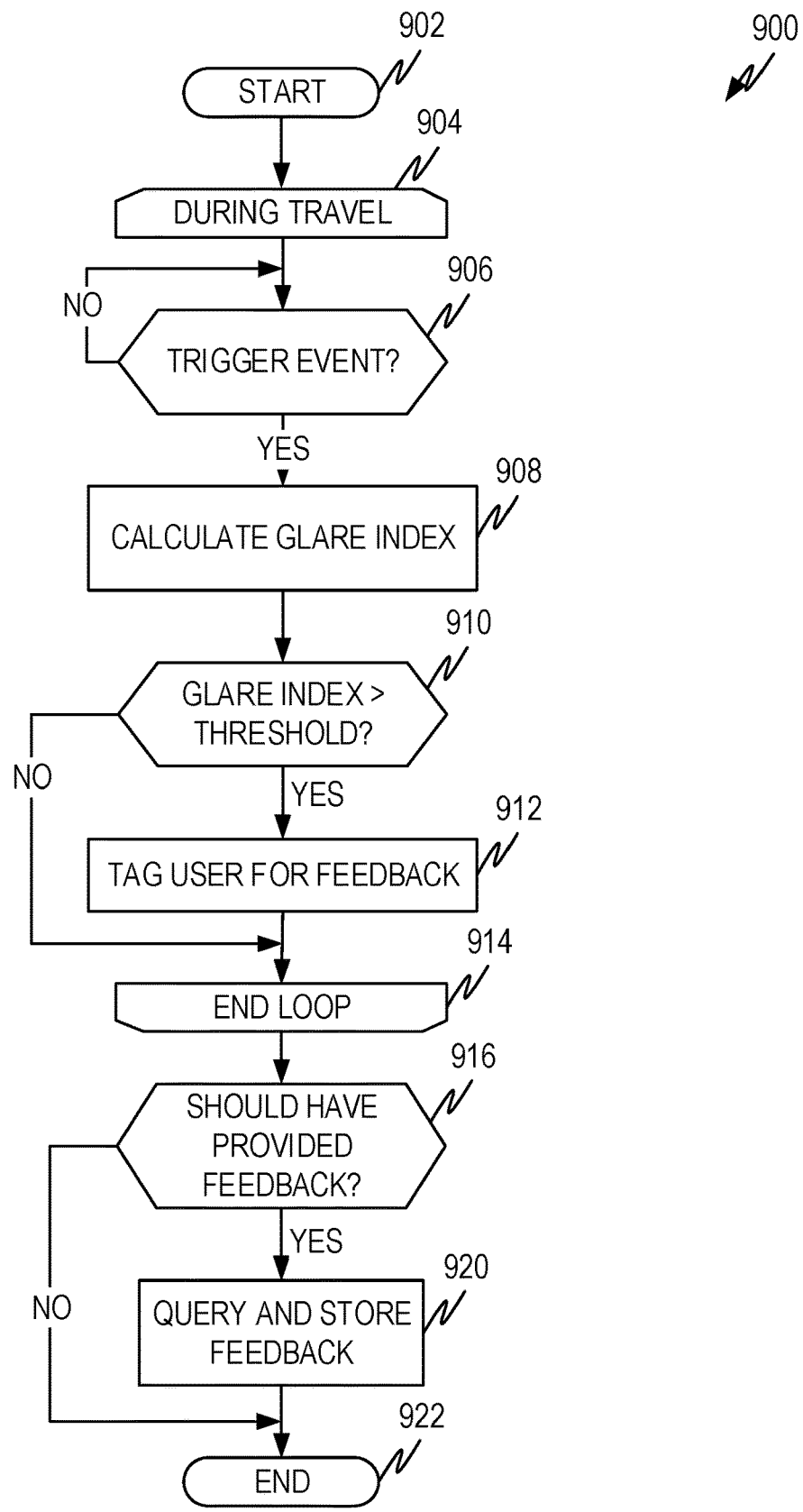
FIG. 9 illustrates a representative flow diagram for querying for feedback according to some aspects of the present disclosure.

FIG. 9 illustrates a representative flow diagram 900 for querying for feedback according to some aspects of the present disclosure. Feedback can be requested and/or proactively given in several ways. For example, for self-driving vehicles, they can measure sensor degradation and/or have sun glare sensors incorporated into the sensor suite and automatically provide sun glare feedback whenever conditions indicate that sun glare is experienced, for example, when the sensor degradation exceeds a threshold or when the sun glare sensor senses sun glare above a threshold. Users driving a vehicle can also use a sun glare sensor that automatically sends sun glare information, such as when the measured sun glare exceeds a threshold. This will alleviate the need for users to manually provide sun glare information while the user is driving.

Sun glare sensors are available. Additionally, sun tracking sensors can also be utilized. Basically, any sensor that can sense whether the sun is within the field of view, and if so, measure an intensity metric can be utilized. The intensity metric can be coupled with effects caused by the sun such as thermal heating, optical sensing, and so forth.

Additionally, or alternatively, the flow diagram 900 monitors sun glare during navigation and if the user experienced sun glare or if sun glare was likely experienced, the user can be asked to provide feedback. In this way users that have not experienced or have not likely experienced sun glare are not bothered by requests for feedback.

The flow diagram begins at operation 902 and proceeds to the loop beginning at operation 904. The loop that begins at operation 904 and ends at operation 914 is designed to identify whether the user likely experienced sun glare. The operations inside the loop can be replaced with either monitoring the output of a sun glare sensor or another method for determining whether it is likely that the user experienced sun glare.

The loop that begins at operation 904 and ends at operation 914 is performed during travel. For example, the loop can be performed on a periodic or aperiodic basis upon occurrence of a trigger event. Representative trigger events include, but are not limited to, the direction of travel changing by more than a threshold amount, the elapsed time from the last time the loop was executed is longer than a threshold amount, the distance traveled since last time the loop was executed is greater than a threshold amount, and the predicted position of the sun changes by more than a threshold amount. Combinations of trigger events can also be used. For example, a set of one or more of the trigger events can be created and the loop executed when any of the trigger events occur. As another example, multiple trigger events can be used in a combination where some combination of the trigger events have to occur, such as the distance traveled since last time the loop was executed will trigger execution as long as a threshold time has also passed since the loop was executed.

Operation 906 tests for occurrence of a trigger event and, upon occurrence of the trigger event, execution proceeds to operation 908 where the glare index is calculated. Which glare index is calculated depends upon the accuracy desired. Often it is sufficient to simply calculate the basic glare index 708.

Operation 910 identifies whether the glare index exceeds a threshold. The threshold is set so that when it is exceeded, the user likely experienced sun glare.

Rather than operation 906 and operation 910, the system can ascertain if sun glare was likely as previously discussed in conjunction with FIG. 5 such as by comparing the sun azimuth and/or elevation to one or more thresholds.

If sun glare was likely, or if the sun glare index exceeds a threshold, operation 912 tags the user for feedback. This can occur in any fashion, such as setting a flag that feedback should be requested if not automatically submitted by the user.

After navigation ends, operation 916 identifies whether a user was tagged for feedback, and if so, whether the user has already submitted feedback on the sun glare that was experienced. If so, the feedback is stored in operation 920 for use later on as explained herein. If the user was tagged for feedback and has not submitted feedback, operation 920 submits a request to the user asking for feedback. For example, a query can be displayed on a display of a user device and the user can submit the feedback. For example, a user may be presented with a radio button list or a rating scale that asks the user what level of sun glare was experienced on a scale of zero to five. The feedback is then stored in operation 920.

If a user was not tagged for feedback, no feedback is requested from the user, although if the user proactively submits feedback, it will be stored.

The flow diagram ends at operation 922.

Other mechanisms can be used to ascertain whether a user likely experienced sun glare and/or identify a subjective glare impact to the user. As an example, the effects of sun glare can be measured and/or estimated. A user experiencing sun glare is likely to drive slower than the user would otherwise drive along a given route when no other influences are around such as heavy traffic that would slow a user. The slower a user drives, the more impact the sun is having on a user. Other impacts may also be measured, such as failure to begin moving after a light turns green.

Thus, in some embodiments, telemetry from the vehicle and other sources can be combined to calculate subjective glare impact. In one example, if the vehicle is going underspeed as compared to the speed a user usually drives along a given route, as compared to the speed limit, or both, and if the predicted glare index (e.g., calculated in operation 908) is above one or more thresholds, and if other factors are not predicted or calculated to slow the user, then the subjective impact can be attributed to sun glare and the impact in the form of a metric such as reduction in speed can be saved as "feedback" for that user, for the stretch of road, and/or for the vehicle configuration.

Other factors that may slow the user can be heavy traffic, signal lights and other factors. The impact of traffic can be calculated by looking at the distance between the user's vehicle and the vehicle in front of and/or behind the user's vehicle. Distance sensors are beginning to be incorporated into vehicles, such as for automatic braking, autopilot, blind spot detection, and/or collision avoidance purposes. Thus, modern vehicles have a reasonable picture of the distance of surrounding vehicles. These metrics can be used to estimate whether traffic is sufficient to otherwise slow the user's vehicle. For example, when no vehicles are within sensor range or when other vehicles fall outside a particular sensed range, the traffic is not likely the cause of any slowing. Signal lights can also be monitored to determine the impact they have on vehicle speed.

The calculated sun glare impacts, such as speed reduction, can be utilized as a subject glare impact that can be used either by itself or, through a trained machine learning model, mapped to a subjective glare index. The impact and/or index can be aggregated for the user, for the route, or on other basis.

Figure 10:
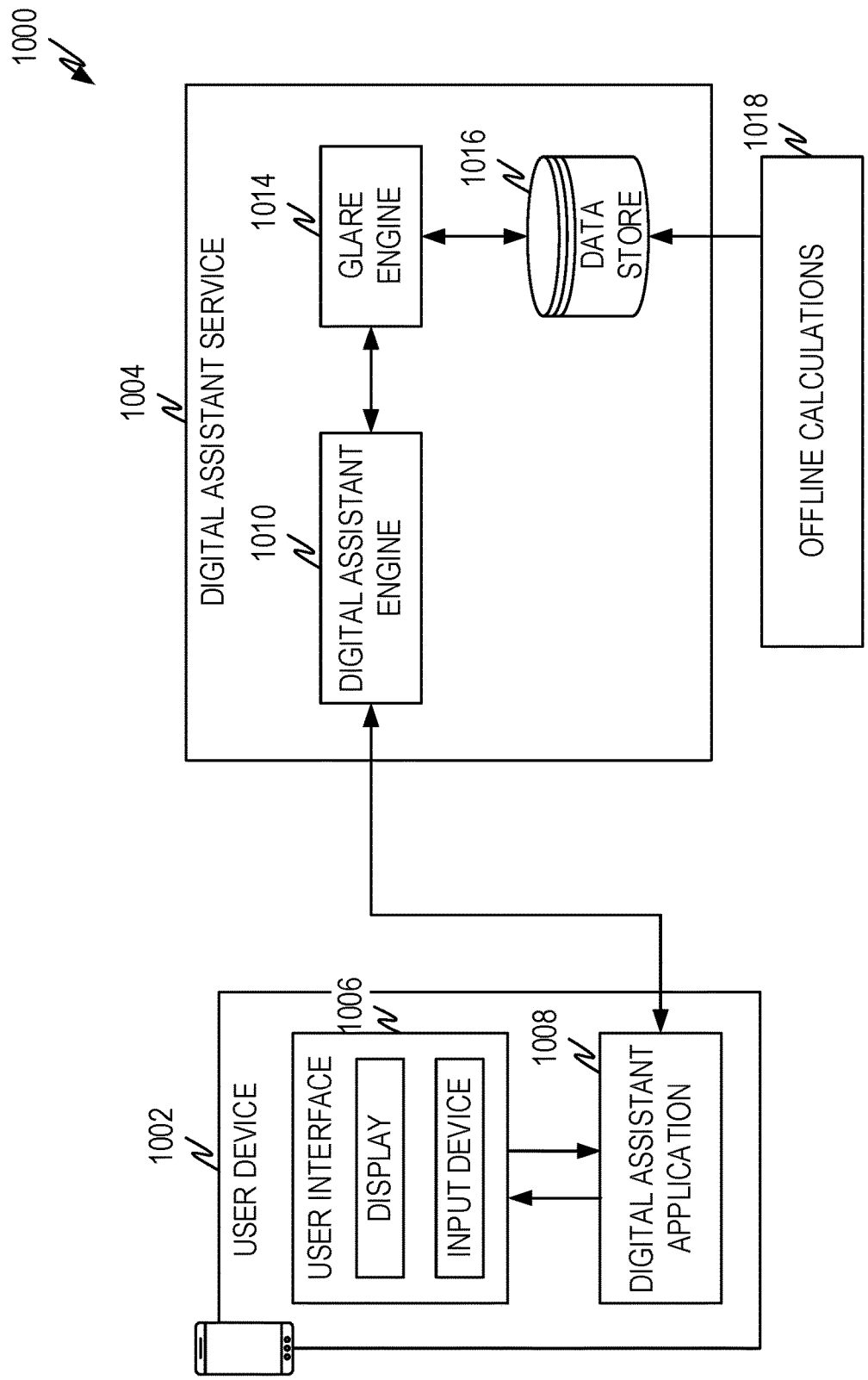
FIG. 10 illustrates a representative system architecture according to some aspects of the present disclosure.

FIG. 10 illustrates a representative system architecture 1000 according to some aspects of the present disclosure. This architecture involves a digital assistant rather than a mapping or navigation application and service. The architecture comprises a user interface 1006 and a digital assistant application 1008 on a user device 1002. The digital assistant application 1008 can be a separate application, can be incorporated into the operating system of the user device 1002, or any combination thereof. The local digital assistant 1008 relies on a back end digital assistant service 1004. The digital assistant service 1004 comprises a digital assistant engine 1010 and a glare engine 1014 along with its associated data store 1016. As an alternative, the glare engine 1014 alone or the glare engine 1014 and its associated data store 1016 can reside on the user device 1002.

The local digital assistant 1008 can provide contextual information back to the digital assistant service 1004. Through the contextual information, as well as user and contextual information accessed from other locations, the digital assistant service 1004 can monitor user and contextual information and proactively perform activities on behalf of the user, provide information and suggestions to the user, and so forth. For example, suppose a user's calendar indicates an upcoming trip out of town. The digital assistant can recognize from the user's calendar and from other information that the user is scheduled to take a flight on the day of the trip. The digital assistant can suggest actions to take on behalf of the user such as checking into the user's flight at the appropriate time, scheduling a car for the trip to the airport, suggest a time to leave for the airport, showing the user the weather at the destination location and so forth.

The glare engine 1014 allows the digital assistant service 1004 to increase the actions that the digital assistant can perform on behalf of the user. For example, contextual information may indicate the user is going to drive to the airport. In this situation, the digital assistant can suggest to the user that the user take a particular route to minimize sun glare using the routing methodologies disclosed herein. Additionally, the digital assistant can suggest an earlier time to leave that will get the user to the airport on time but avoid the worst sun glare. Additionally, the digital assistant can suggest to the user that the user make sure to take sun glasses or otherwise prepare for the sun glare. These capabilities can also be suggested in response to other contexts such as knowing that a user typically leaves for work at a particular time, takes a particular route, and so forth.

Figure 11:
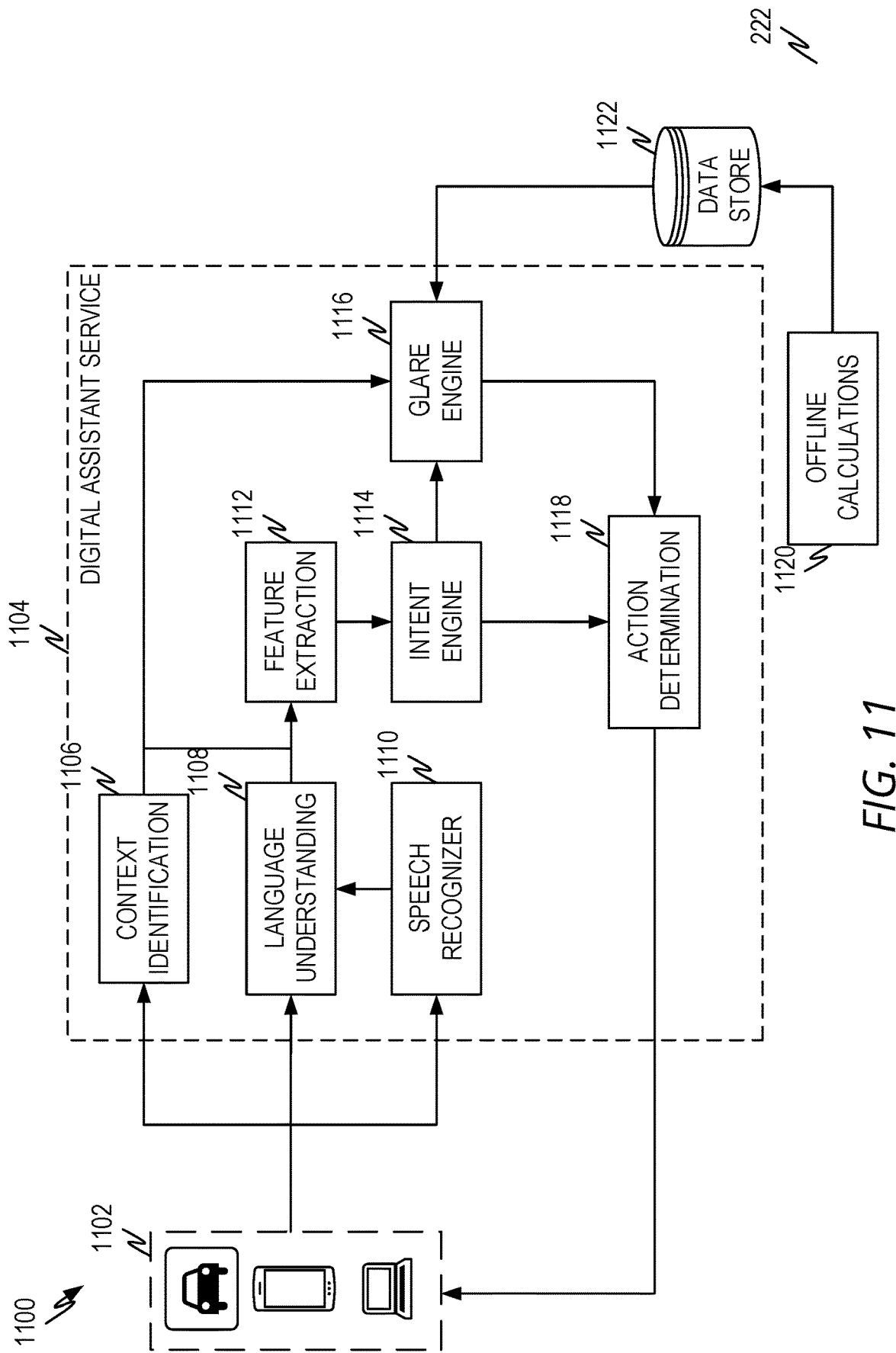
FIG. 11 illustrates another representative architecture according to some aspects of the present disclosure.

FIG. 11 illustrates another representative architecture 1100 according to some aspects of the present disclosure. This architecture 1100 shows a representative digital assistant service 1104 and illustrates how a glare engine 1116 can be incorporated and utilized.

The digital assistant service 1104 interacts with a user device 1102 as described herein. Also as described, a user device 1102 can comprise a mobile device, a tablet, a wearable, a laptop computer, a vehicle, or any other type of user device.

The digital assistant service 1104 can interact with the user either in a proactive manner as described above, or in a reactive manner, such as responding to a query, question, request, and so forth (collectively referred to as a query). Queries can be received in a variety of formats such as speech, text, gesture and so forth. Thus, the digital assistant service 1104 can comprise a speech recognizer 1110 that converts speech to text. Speech to text methods are well known in the art and typically rely on machine learning models such as Long Short Term Memory (LSTM) type Recurrent Neural Networks (RNN) that have been appropriately trained.

Textual queries, queries that arrived in speech or other formats and that were converted to textual format are passed to the language understanding model 1108. The language understanding model 1108 parses the text and passes the parsed text to the feature extraction engine 1112 which extracts features from which intent and slot detection is performed by the intent engine 1114.

The features that are extracted as well as the intent/slot detection can be influenced by the context in which the query was made. Thus, information from the user device 1102 and/or other sources are presented to the context identification engine 1106 which extracts the context from the available information. The context identification engine 1106 also provides information to the feature extraction engine 1112 to allow intent/slot detection by the intent engine 1114. This is what allows the digital assistant service 1104 to engage with the user in a proactive manner and not simply respond to queries submitted by the user.

Methods for the speech recognizer 1110, language understanding model 1108, context identification engine 1106, feature extraction engine 1112 and intent engine 1114 are known in existing digital assistants.

To allow the digital assistant service 1104 to engage and react based on sun glare information, sun glare engine 1116 can be incorporated into the digital assistant service 1104 or accessed by the digital assistant service 1104. The sun glare engine identifies the likelihood of sun glare based on input contextual information and/or intent(s) and slot(s) detected by the intent engine 1114.

The sun glare engine 1116 can utilize the contextual information and/or the intent(s)/slot(s) detected by the intent engine 1114 to identify likely sun glare information. As described herein, sun glare is a phenomenon that is dependent upon the location, time (time of day, day of year, year), and location. Also as described herein, the sun glare index can be basic sun glare index, predicted sun glare index, and/or user sun glare index, depending on the accuracy and/or utility to which the sun glare index is being put. The context, and/or intent(s)/slot(s) can let the sun glare index engine 1116 know when a sun glare check or calculation will be useful when deciding what action(s) to take in the action determination engine 1118. Thus, when the context, and/or intent(s)/slot(s) indicates that a user is planning on traveling somewhere, the sun glare engine 1116 can calculate the likelihood of sun glare along the route and/or an expected sun glare index (basic, predicted, and/or user).

The sun glare engine 1116 can utilize a set of rules and/or a machine learning model that takes the context, and/or intent(s)/slot(s) as input to determine when travel is likely. Once that happens, then the likelihood sun glare can be calculated or checked, and/or the expected sun glare predicted as discussed herein. In making these determinations, the sun glare engine 1116 can rely on a data store 1122, which contains offline calculations 1120 as described herein.

Once the sun glare likelihood and/or predicted sun glare index is calculated, the results can be passed to the action determination engine 1118. The action determination engine 1118 can utilize the sun glare information as part of the input to determine what actions should be taken and/or proposed to the user. How that is accomplished should be evident to those of skill in the art based on the disclosure herein. For example, anytime travel is involved, the sun glare likelihood and/or expected sun glare can be factored in to determining what warning should be given to the user about sun glare, if any. Additionally, whenever the action determination engine 1118 calculates a route (or has a route calculated), the sun glare can be factored in as disclosed herein. Still further, the sun glare likelihood and/or expected sun glare can be factored in to any recommendations given to the user to prepare for expected travel, such as advising the user to take sun glasses, take a route to avoid sun glare, and so forth.

Additionally, or alternatively, the action determination engine 1118 can identify when sun glare information would be helpful in determining what course of action to take and request desired sun glare information from the sun glare engine 1116. In such an embodiment, the action determination engine 1118 evaluates the intent(s)/slot(s) and/or context information and the sun glare engine 1116 does not need to monitor that information. Thus, the sun glare engine 1116 is connected directly to the action determination engine 1118 and receives requests from and provides information back to the action determination engine 1118.

Figure 12:
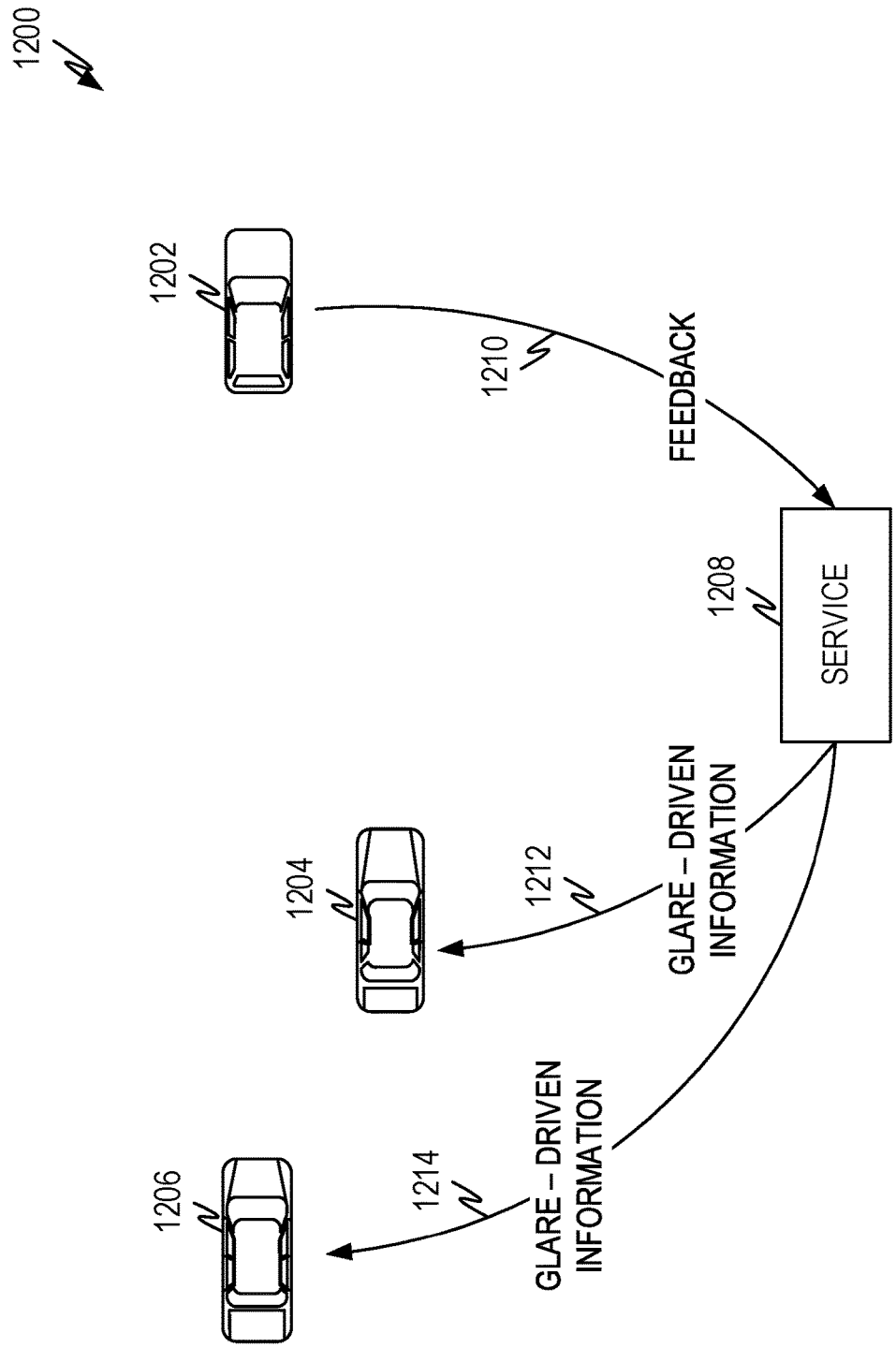
FIG. 12 illustrates transfer information for sun glare according to some aspects of the present disclosure.

FIG. 12 illustrates transfer 1200 information for sun glare according to some aspects of the present disclosure. As discussed above, in some embodiments of the present disclosure, feedback about sun glare can be provided from the user device back to a service. This can happen automatically such as by sensors monitoring sun glare and/or by users proactively providing sun glare information back to the service. This has been labeled feedback herein and can be used to assess the subjective user and/or sensor experience of sun glare.

This ability to send and receive feedback provides an opportunity to let other user devices know, in real time or substantially real time, what other users and/or sensors are experiencing. In this context real time means in a time frame before the sun glare appreciably changes. For example, suppose a self-driving vehicle is navigating a route and other self-driving vehicles are navigating the same or a close route. The leading vehicle 1202 can provide feedback 1210 about the sun glare being experienced at a particular location (and at a particular time). The service 1208 can look for other vehicles 1204, 1206 that are projected to be in the same or a close location. In this context close means a location from which the sun glare does not appreciably change.

Changes in location may not appreciably change the sun azimuth and elevation relative to the vehicle. Similarly, the progress across the sky of the sun is known and does not change appreciably within several minutes. An examination of the table above shows that for a 15-minute interval, the sun elevation changes between zero and three degrees. The sun azimuth changes between two and 6 degrees over the same time period. When comparing sun glare experienced, these changes may not mean very much. Thus, a report by one vehicle 1202 may be relevant to other vehicles 1204, 1206 that may be in a similar location within a designated time period.

Based on speed of travel and route, how much the sun glare will change by the time vehicle 1204 and/or vehicle 1206 reaches an area within a threshold distance from the location that vehicle 1202 reported sun glare feedback can be estimated by identifying how much the sun is expected to move, whether sun's motion will likely increase sun glare (e.g., move toward a region where sun glare is likely to be worse), or will likely decrease (e.g., move to a region where sun glare is likely to be less), or neither. The principles described in conjunction with FIG. 7 can be applied to perform these estimations. Thus, based on the feedback of vehicle 1202, the vehicles 1204 and/or 1206 will be able to estimate how they will be impacted by the sun glare when they reach a threshold distance from where the feedback 1210 was reported. Based on this, the vehicles 1204, 1206 may decide to take actions to mitigate or avoid sun glare. These can include rerouting to avoid or reduce the sun glare, warn users to take precautions, and so forth.

Thus, real-time feedback can be passed to the service 1208 and the service 1208 can estimate the likely sun glare for others such as vehicles 1204, 1206 and provide the information to them 1212, 1214. As an alternative, the service 1208 can pass information that will allow each vehicle to perform their own sun glare calculations rather than performing the calculations for them. Any information passed to others can be stripped of any personal or other information to preserve privacy as appropriate.

Sun glare information may also be shared with other users with appropriate user permission. This will allow users to compare their experience to other users and to adjust their behavior based on the subjective glare index experience of other users. Because sun glare is at some level subjective, a user may find that their subjective experience is closer to one user than another. For example, if the sun glare index exists on a scale of 1-10 (1 being low and 10 being very high), a user may find that user B's rating of a 7 is closer to what they experience than user C's rating of 3. In this case the user may elect to "follow" user B's ratings and utilize user B's ratings to predict what their own experience may be.

Thus, embodiments of FIG. 12 can include transferring one user's ratings (either in real time or in non-real time) to other users.

Example Machine Architecture and Machine-Readable Medium

Figure 13:
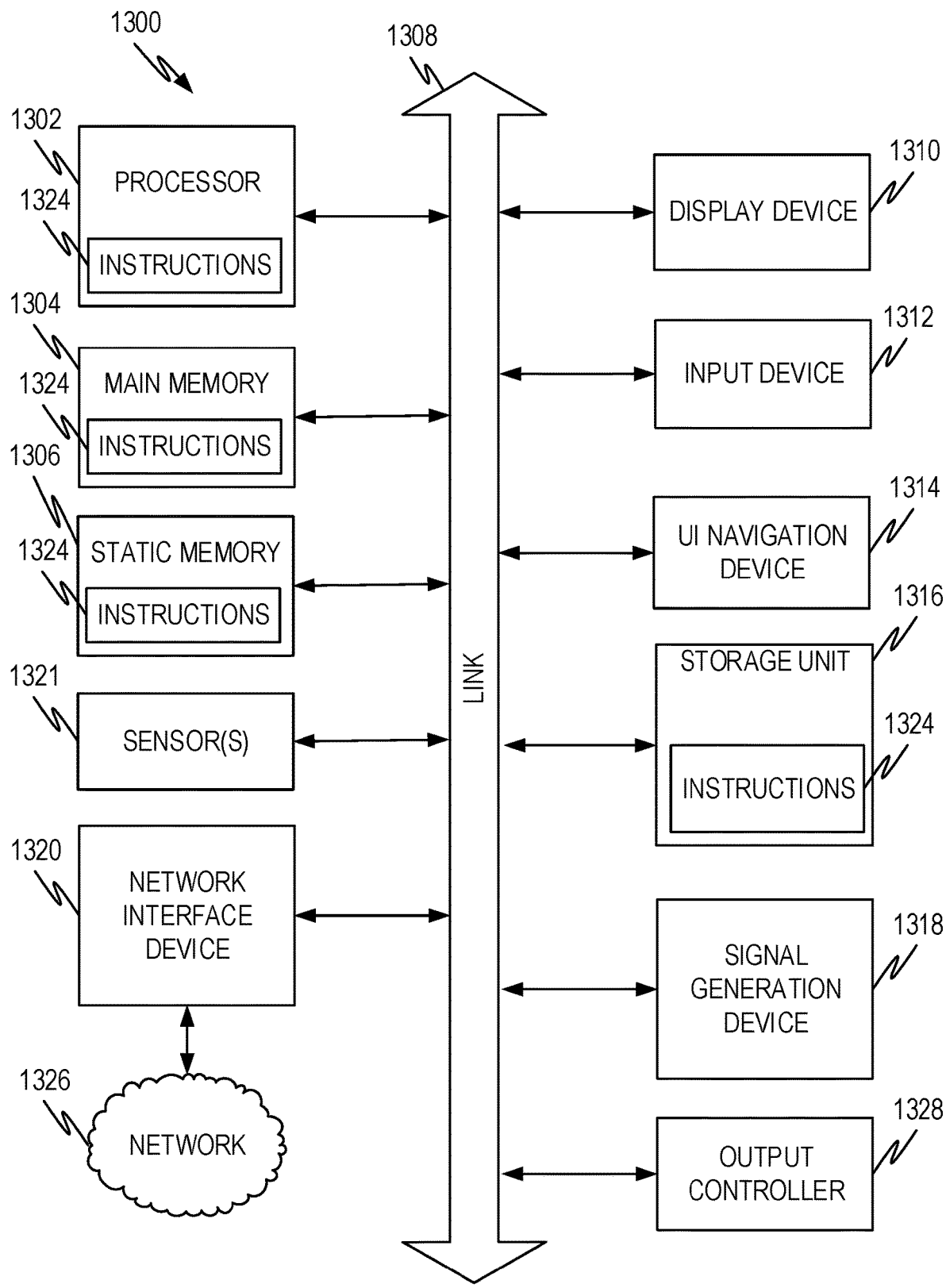
FIG. 13 illustrates a representative machine architecture suitable for implementing the systems and other aspects disclosed herein or for executing the methods disclosed herein.

FIG. 13 illustrates a representative machine architecture suitable for implementing the systems and other aspects disclosed herein or for executing the methods disclosed herein. The machine of FIG. 13 is shown as a standalone device (such as the mobile devices described herein or devices where services described herein are implemented), which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 13 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 1300 includes at least one processor 1302 (e.g., a central processing unit (CPU), a graphics processing unit (GPU), advanced processing unit (APU), or combinations thereof), one or more memories such as a main memory 1304, a static memory 1306, or other types of memory, which communicate with each other via link 1308. Link 1308 may be a bus or other type of connection channel. The machine 1300 may include further optional aspects such as a graphics display unit 1310 comprising any type of display. The machine 1300 may also include other optional aspects such as an alphanumeric input device 1312 (e.g., a keyboard, touch screen, and so forth), a user interface (UI) navigation device 1314 (e.g., a mouse, trackball, touch device, and so forth), a storage unit 1316 (e.g., disk drive or other storage device(s)), a signal generation device 1318 (e.g., a speaker), sensor(s) 1321 (e.g., global positioning sensor, accelerometer(s), microphone(s), camera(s), an eye tracking subsystem, and so forth), output controller 1328 (e.g., wired or wireless connection to connect and/or communicate with one or more other devices such as a universal serial bus (USB), near field communication (NFC), infrared (IR), serial/parallel bus, etc.), and a network interface device 1320 (e.g., wired and/or wireless) to connect to and/or communicate over one or more networks 1326.

Rather than the more conventional microprocessor, or in conjunction with a more conventional processor, Neural Network chips can be used to implement embodiments of the present disclosure. Neural Network chips are specialized chips designed to execute various forms of neural networks and can be used in the machine learning models that are utilized in the embodiments. As such, they are suitable for use in implementing aspects of the present disclosure such as the machine learning models and other neural network aspects of the present disclosure. Based on the disclosure contained herein, those of skill in the art will know how to implement the embodiments of the present disclosure using one or more neural network chips.

Executable Instructions and Machine-Storage Medium

The various memories (i.e., 1304, 1306, and/or memory of the processor(s) 1302) and/or storage unit 1316 may store one or more sets of instructions and data structures (e.g., software) 1324 embodying or utilized by any one or more of the methodologies or functions described herein. These instructions, when executed by processor(s) 1302 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

EXAMPLE EMBODIMENTS

Example 1

A computer implemented method, comprising:
determining a starting location and an ending location;
determining whether sun glare is likely while traveling from the starting location to the ending location;
responsive to determining that sun glare is likely:
determining a first travel route to minimize a first cost function along the first travel route from the starting location to the ending location, the first cost function comprising predicted sun glare;
responsive to determining that sun glare is not likely:
determining a second travel route to minimize a second cost function along the second travel route from the starting location to the ending location, the second cost function excluding sun glare.

Example 2

The method of example 1 wherein the first cost function comprises sun glare and travel time.

Example 3

The method of example 1 wherein the first cost function comprises sun glare and estimated traffic.

Example 4

The method of example 1 wherein the second cost function comprises travel time.

Example 5

The method of example 1 wherein the second cost function comprises estimated traffic.

Example 6

The method of example 1 wherein predicted sun glare is calculated by operations comprising:
estimating start time and end time for travel along the first travel route;
determining a plurality of base sun glare-location pairs corresponding to estimated locations along the first travel route based on the azimuth and elevation of the sun at a time corresponding to the estimated locations; and
utilizing the base sun glare as the predicted sun glare for the corresponding location.

Example 7

The method of example 6 wherein the base sun glare is adjusted based on environmental factors prior to being utilized as the predicted sun glare for the corresponding location.

Example 8

The method of example 6 wherein the base sun glare is adjusted using a trained machine learning model prior to being utilized as the predicted sun glare for the corresponding location.

Example 9

The method of example 1, 2, 3, 4, 5, 6, 7 or 8 further comprising:
sending sun glare information to a navigation server.

Example 10

A system comprising:
a processor and device-storage media having executable instructions which, when executed by the processor, cause the system to perform operations comprising:
determining a travel route to minimize a cost function along the travel route from a starting location to an ending location, the cost function comprising predicted sun glare;
receiving perceived sun glare from a user device navigating along the travel route;
providing the perceived sun glare to a second user device.

Example 11

The system of example 10 wherein the second user device is also navigating along the travel route.

Example 12

The system of example 10 or 11 wherein predicted sun glare is calculated by operations comprising:
estimating start time and end time for travel along the first travel route;
determining a plurality of base sun glare-location pairs corresponding to estimated locations along the first travel route based on the azimuth and elevation of the sun at a time corresponding to the estimated locations; and
utilizing the base sun glare as the predicted sun glare for the corresponding location.

Example 13

The system of example 12 wherein the base sun glare is adjusted based on environmental factors prior to being utilized as the predicted sun glare for the corresponding location.

Example 14

The system of example 13 wherein environmental factors comprises at least one of:
a shadow factor;
a weather factor.

Example 15

The system of example 12 wherein the base sun glare is adjusted using a trained machine learning model prior to being utilized as the predicted sun glare for the corresponding location.

Example 16

A computer implemented method, comprising:
determining a starting location and an ending location;
determining whether sun glare is likely while traveling from the starting location to the ending location;
responsive to determining that sun glare is likely:
determining a first travel route to minimize a first cost function along the first travel route from the starting location to the ending location, the first cost function comprising predicted sun glare;
responsive to determining that sun glare is not likely:
determining a second travel route to minimize a second cost function along the second travel route from the starting location to the ending location, the second cost function excluding sun glare.

Example 17

The method of example 16 wherein the first cost function comprises sun glare and travel time.

Example 18

The method of example 16 wherein the first cost function comprises sun glare and estimated traffic.

Example 19

The method of example 16 wherein the second cost function comprises travel time.

Example 20

The method of example 16 wherein the second cost function comprises estimated traffic.

Example 21

The method of example 15, 17, 18, 19, or 20 wherein predicted sun glare is calculated by operations comprising:
estimating start time and end time for travel along the first travel route;
determining a plurality of base sun glare-location pairs corresponding to estimated locations along the first travel route based on the azimuth and elevation of the sun at a time corresponding to the estimated locations; and
utilizing the base sun glare as the predicted sun glare for the corresponding location.

Example 22

The method of example 21 wherein the base sun glare is adjusted based on environmental factors prior to being utilized as the predicted sun glare for the corresponding location.

Example 23

The method of example 21 wherein the base sun glare is adjusted using a trained machine learning model prior to being utilized as the predicted sun glare for the corresponding location.

Example 24

The method of example 16, 17, 18, 19, 20, 21, 22, or 23 further comprising:
sending sun glare information to a navigation server.

Example 25

The method of example 16, 17, 18, 19, 20, 21, 22, 23, or 24 further comprising:
providing the perceived sun glare to a second user device.

Example 26

The method of example 25 wherein the second user device is navigating along the first travel route or the second travel route.

Example 27

The method of example 16, 17, 18, 19, 20, 21, 22, 23, 24, 25 or 26 wherein determining whether sun glare is likely comprises:
estimating start time for travel;
calculating an elevation angle of the sun for the estimated start time; and
determining that sun glare is likely when the elevation angle falls below a threshold elevation angle.

Example 28

The method of example 16, 17, 18, 19, 20, 21, 22, 23, 24, 25 or 26 wherein determining whether sun glare is likely comprises:
estimating start time for travel;
calculating an elevation angle of the sun for the estimated start time;
determining a predicted sun glare index corresponding to the elevation angle;
determining that sun glare is likely when the predicted sun glare is above a threshold value.

Example 29

An apparatus comprising means to perform a method as in any preceding example.

Example 30

Machine-readable storage including machine-readable instructions, when executed, to implement a method or realize an apparatus as in any preceding example.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A computer implemented method, comprising:
   determining a starting location and an ending location;
   determining a first time range during which travel will occur from the starting location to the ending location;
   determining a first sun position during at least a portion of the first time range;
   generating a basic glare index from the first sun position and a predetermined relationship between sun positions and corresponding glare indices;
   determining whether sun glare is likely while traveling from the starting location to the ending location based on the basic glare index;
   responsive to determining that sun glare is likely:
      generating a predicted glare index by modifying the basic glare index in accordance with environmental adjustments, the environmental adjustments accounting for both: (1) near obstructions of the sun at the first sun position that are caused by, or within, a vehicle traveling from the starting location to the ending location and (2) far obstructions of the sun at the first sun position that are external to the vehicle; and
      determining a first travel route to minimize a first cost function along the first travel route from the starting location to the ending location, the first cost function being based on the predicted glare index; and
   responsive to determining that sun glare is not likely:
      determining a second travel route to minimize a second cost function along the second travel route from the starting location to the ending location, the second cost function excluding sun glare.

2. The method of claim 1, wherein the predetermined relationship between sun positions and corresponding glare indices is a curve in two or more dimensions correlating the sun positions to the corresponding glare indices.

3. The method of claim 1, wherein the predetermined relationship between sun positions and corresponding glare indices is specific to a first sensor installed on the vehicle.

4. The method of claim 1, wherein the predetermined relationship between sun positions and corresponding glare indices is wavelength specific.

5. The method of claim 1, wherein the predetermined relationship between sun positions and corresponding glare indices is generated by a trained machine learning model that was trained based on pre-existing pairs of sun positions and corresponding glare indices.

6. The method of claim 1, wherein the far obstructions of the sun comprise weather obstructions, the weather obstructions being one of: observed weather obstructions, predicted weather obstructions or historical weather obstructions.

7. The method of claim 1, wherein the far obstructions of the sun comprise atmospheric obstructions, the atmospheric obstructions being one of: observed atmospheric obstructions, predicted atmospheric obstructions or historical atmospheric obstructions.

8. The method of claim 1, wherein the near obstructions comprise at least one of: a roof of the vehicle or a sun visor of the vehicle.

9. The method of claim 1, wherein the environmental adjustments accounting for the far obstructions are based on modeled shadowing effects of one or more shadows associated with the far obstructions.

10. The method of claim 1, wherein the environmental adjustments are generated by a trained machine learning model that was trained based on pre-existing pairs of environmental adjustments and corresponding predict glare indices.

11. The method of claim 1, wherein the determining that sun glare is likely is based on the basic glare index exceeding a predetermined threshold.

12. The method of claim 1, further comprising generating a user glare index by modifying the predicted glare index in accordance with user adjustments that account for subjective user factors.

13. The method of claim 12, wherein the subjective user factors quantify how bothersome sun glare is to an individual user.

14. The method of claim 12, wherein the first cost function is directly based on the user glare index and, thereby, indirectly based on the predicted glare index.

15. The method of claim 12, further comprising:
   detecting the sun glare during the travel from the starting location to the ending location;
   querying a user traveling from the starting location to the ending location for feedback, the querying being triggered by the detecting the sun glare; and
   modifying the user adjustments in accordance with user feedback received in response to the querying.

16. The method of claim 15, wherein the detecting the sun glare comprises detecting sensor degradation exceeding a sensor degradation threshold.

17. The method of claim 15, wherein the detecting the sun glare comprises detecting that a sun glare sensor is sensing sun glare above a sun glare threshold.

18. The method of claim 15, wherein the detecting the sun glare comprises detecting sun glare impacts on the user's operation of the vehicle during the travel from the starting location to the ending location.

19. A computer storage medium comprising executable instructions that, when executed by a processor of a machine, cause the machine to perform acts comprising:
   determining a starting location and an ending location;
   determining a first time range during which travel will occur from the starting location to the ending location;
   determining a first sun position during at least a portion of the first time range;
   generating a basic glare index from the first sun position and a predetermined relationship between sun positions and corresponding glare indices;
   determining whether sun glare is likely while traveling from the starting location to the ending location based on the basic glare index;
   responsive to determining that sun glare is likely:
      generating a predicted glare index by modifying the basic glare index in accordance with environmental adjustments, the environmental adjustments accounting for both: (1) near obstructions of the sun at the first sun position that are caused by, or within, a vehicle traveling from the starting location to the ending location and (2) far obstructions of the sun at the first sun position that are external to the vehicle; and determining a first travel route to minimize a first cost function along the first travel route from the starting location to the ending location, the first cost function comprising the predicted glare index; and responsive to determining that sun glare is not likely:
  determining a second travel route to minimize a second cost function along the second travel route from the starting location to the ending location, the second cost function excluding sun glare.

20. A computing device comprising:
one or more processing units; and
one or more computer storage media comprising executable instructions that, when executed by at least some of the one or more processing units, cause the computing device to:
  determine a starting location and an ending location;
  determine a first time range during which travel will occur from the starting location to the ending location;
  determine a first sun position during at least a portion of the first time range;
  generate a basic glare index from the first sun position and a predetermined relationship between sun positions and corresponding glare indices;
  determine whether sun glare is likely while traveling from the starting location to the ending location based on the basic glare index;
  responsive to determining that sun glare is likely:
    generate a predicted glare index by modifying the basic glare index in accordance with environmental adjustments, the environmental adjustments accounting for both: (1) near obstructions of the sun at the first sun position that are caused by, or within, a vehicle traveling from the starting location to the ending location and (2) far obstructions of the sun at the first sun position that are external to the vehicle; and
    determine a first travel route to minimize a first cost function along the first travel route from the starting location to the ending location, the first cost function comprising the predicted glare index; and
  responsive to determining that sun glare is not likely:
    determine a second travel route to minimize a second cost function along the second travel route from the starting location to the ending location, the second cost function excluding sun glare.

* * * * *